US011924397B2

(12) United States Patent
Sinharoy et al.

(10) Patent No.: US 11,924,397 B2
(45) Date of Patent: Mar. 5, 2024

(54) GENERATION AND DISTRIBUTION OF IMMERSIVE MEDIA CONTENT FROM STREAMS CAPTURED VIA DISTRIBUTED MOBILE DEVICES

(71) Applicant: Samsung Electronics Co., Ltd., Suwon-si (KR)

(72) Inventors: Indranil Sinharoy, Richardson, TX (US); Abhishek Sehgal, Plano, TX (US); Nishith Tripathi, Parker, TX (US); Madhukar Budagavi, Plano, TX (US); Esmaeil Faramarzi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/381,078

(22) Filed: Jul. 20, 2021

(65) Prior Publication Data

US 2022/0030214 A1    Jan. 27, 2022

Related U.S. Application Data

(60) Provisional application No. 63/183,992, filed on May 4, 2021, provisional application No. 63/055,658, filed on Jul. 23, 2020.

(51) Int. Cl.
*H04N 13/282* (2018.01)
*H04N 13/139* (2018.01)
(Continued)

(52) U.S. Cl.
CPC ......... *H04N 13/282* (2018.05); *H04N 13/139* (2018.05); *H04N 13/167* (2018.05); *H04N 13/178* (2018.05)

(58) Field of Classification Search
CPC .. H04N 13/282; H04N 13/139; H04N 13/167; H04N 13/178; H04N 21/21805;
(Continued)

(56) References Cited

U.S. PATENT DOCUMENTS 9,129,640 B2    9/2015  Hamer
9,219,852 B2   12/2015  Lim et al.
(Continued)

FOREIGN PATENT DOCUMENTS

KR    10-2009-0069138 A    6/2009
KR       10-1396008 B1    5/2014
(Continued)

OTHER PUBLICATIONS

Ansari, S., et al., "Wireless Software Synchronization of Multiple Distributed Cameras", Jun. 11, 2019, <URL: https://arxiv.org/abs/1812.09366>, 12 pages.
(Continued)

*Primary Examiner* — Tung T Vo

(57) ABSTRACT

A method for generating content includes receiving information regarding electronic devices respectively capturing content associated with an event. The method also includes identifying, based on the received information, one or more parameters for the electronic devices to use in capturing the content, the one or more parameters identified to assist in generating multi-view content for the event from the captured content. The method further includes identifying, based on the received information, a common resolution for the electronic devices to use in capturing the content. Additionally, the method includes identifying, based on the received information, a common frame rate for the electronic devices to use in capturing the content. The method also includes sending information indicating the one or more
(Continued)

parameters, the common resolution, and the common frame rate to the electronic devices.

20 Claims, 17 Drawing Sheets

(51) Int. Cl.
*H04N 13/167* (2018.01)
*H04N 13/178* (2018.01)

(58) Field of Classification Search
CPC ............ H04N 21/2187; H04N 21/242; H04N 21/2743; H04N 21/41407; H04N 21/4223; H04N 21/6587; H04N 13/194
USPC .......................................................... 348/47
See application file for complete search history.

(56) References Cited

U.S. PATENT DOCUMENTS

| | | | |
|---|---|---|---|
| 9,451,218 B2 | 9/2016 | Hanabusa | |
| 10,771,518 B2 | 9/2020 | Nowak | |
| 10,896,327 B1* | 1/2021 | Lablans | G06V 10/25 |
| 11,093,197 B2* | 8/2021 | Vigna | G06F 3/1446 |
| 11,196,963 B1* | 12/2021 | DiPasquale | H04L 65/403 |
| 11,295,473 B2* | 4/2022 | Tauber | G06T 7/292 |
| 11,509,864 B1* | 11/2022 | Hanton | G06T 11/60 |
| 11,659,466 B2* | 5/2023 | Avadhanam | H04W 36/0022 370/331 |
| 2008/0278582 A1* | 11/2008 | Chung | H04N 7/18 348/E7.085 |
| 2009/0232353 A1* | 9/2009 | Sundaresan | G06V 40/23 348/42 |
| 2010/0097491 A1* | 4/2010 | Farina | H04N 23/843 348/223.1 |
| 2010/0144283 A1* | 6/2010 | Curcio | H04W 4/02 455/66.1 |
| 2010/0303436 A1* | 12/2010 | Chang | H04N 5/765 386/223 |
| 2011/0074965 A1* | 3/2011 | Lee | H04N 23/60 348/E5.024 |
| 2011/0267344 A1* | 11/2011 | Germann | G06V 20/64 382/154 |
| 2012/0062702 A1* | 3/2012 | Jiang | G06T 19/006 348/46 |
| 2013/0250050 A1* | 9/2013 | Kanaujia | H04N 13/106 348/42 |
| 2015/0098690 A1 | 4/2015 | Abbate et al. | |
| 2015/0208056 A1 | 7/2015 | Park et al. | |
| 2015/0215563 A1* | 7/2015 | Yanagidate | H04N 5/0733 348/500 |
| 2015/0304588 A1* | 10/2015 | Jung | H04N 1/00188 348/552 |
| 2016/0094648 A1* | 3/2016 | Han | H04W 76/10 709/209 |
| 2016/0335040 A1* | 11/2016 | Wen | G06F 3/1446 |
| 2017/0026680 A1* | 1/2017 | Sugio | H04N 21/2187 |
| 2017/0054968 A1* | 2/2017 | Woodman | H04N 13/239 |
| 2017/0111413 A1* | 4/2017 | Nowak | H04N 5/247 |
| 2017/0272621 A1* | 9/2017 | Park | H04N 5/247 |
| 2017/0323472 A1 | 11/2017 | Barnes et al. | |
| 2017/0339200 A1* | 11/2017 | Roy | H04L 65/762 |
| 2017/0359689 A1* | 12/2017 | Chhabra | H04W 8/005 |
| 2018/0115438 A1 | 4/2018 | Park et al. | |
| 2018/0115683 A1 | 4/2018 | Lee | |
| 2018/0139364 A1* | 5/2018 | Jannard | H04N 13/189 |
| 2018/0192413 A1* | 7/2018 | Gotman | H04K 3/226 |
| 2018/0242174 A1* | 8/2018 | Thotad | H04L 41/0668 |
| 2018/0343416 A1* | 11/2018 | Kim | H04N 7/181 |
| 2019/0116322 A1* | 4/2019 | Holzer | G06V 10/34 |
| 2019/0356916 A1 | 11/2019 | Handa et al. | |
| 2020/0106716 A1* | 4/2020 | Toshima | H04L 45/42 |
| 2021/0006834 A1* | 1/2021 | Salahieh | H04N 19/597 |
| 2021/0019507 A1* | 1/2021 | Brookshire | G06T 7/30 |
| 2021/0160558 A1* | 5/2021 | Sorkin | H04N 21/262 |
| 2021/0168301 A1* | 6/2021 | Iwakiri | H04N 13/243 |
| 2022/0201344 A1* | 6/2022 | Panje | H04N 21/238 |

FOREIGN PATENT DOCUMENTS

| | | |
|---|---|---|
| KR | 10-2017-0088623 A | 8/2017 |
| KR | 10-1788005 B1 | 10/2017 |
| KR | 10-2019-0054752 A | 5/2019 |
| KR | 102019866 B1 | 9/2019 |
| WO | 2017/079735 A1 | 5/2017 |

OTHER PUBLICATIONS

Latimer, R., et al., "SocialSync: Sub-Frame Synchronization in a Smartphone Camera Network", Computer Vision—ECCV 2014 Workshops, European Conference on Computer Vision, Mar. 20, 2015, <URL: http://citeseerx.ist.psu.edu/viewdoc/download?doi=10.1.1.686.1520&rep=rep1&type=pdf>, 14 pages.

Mehta, I., et al., "Syncam: Capturing Sub-Frame Synchronous Media Using Smartphones", 2017 IEEE International Conference on Multimedia and Expo (ICME), Jul. 10-14, 2017, 6 pages.

International Search Report and Written Opinion of the International Searching Authority dated Oct. 26, 2021, in connection with International Application No. PCT/KR2021/009587, 10 pages.

\* cited by examiner

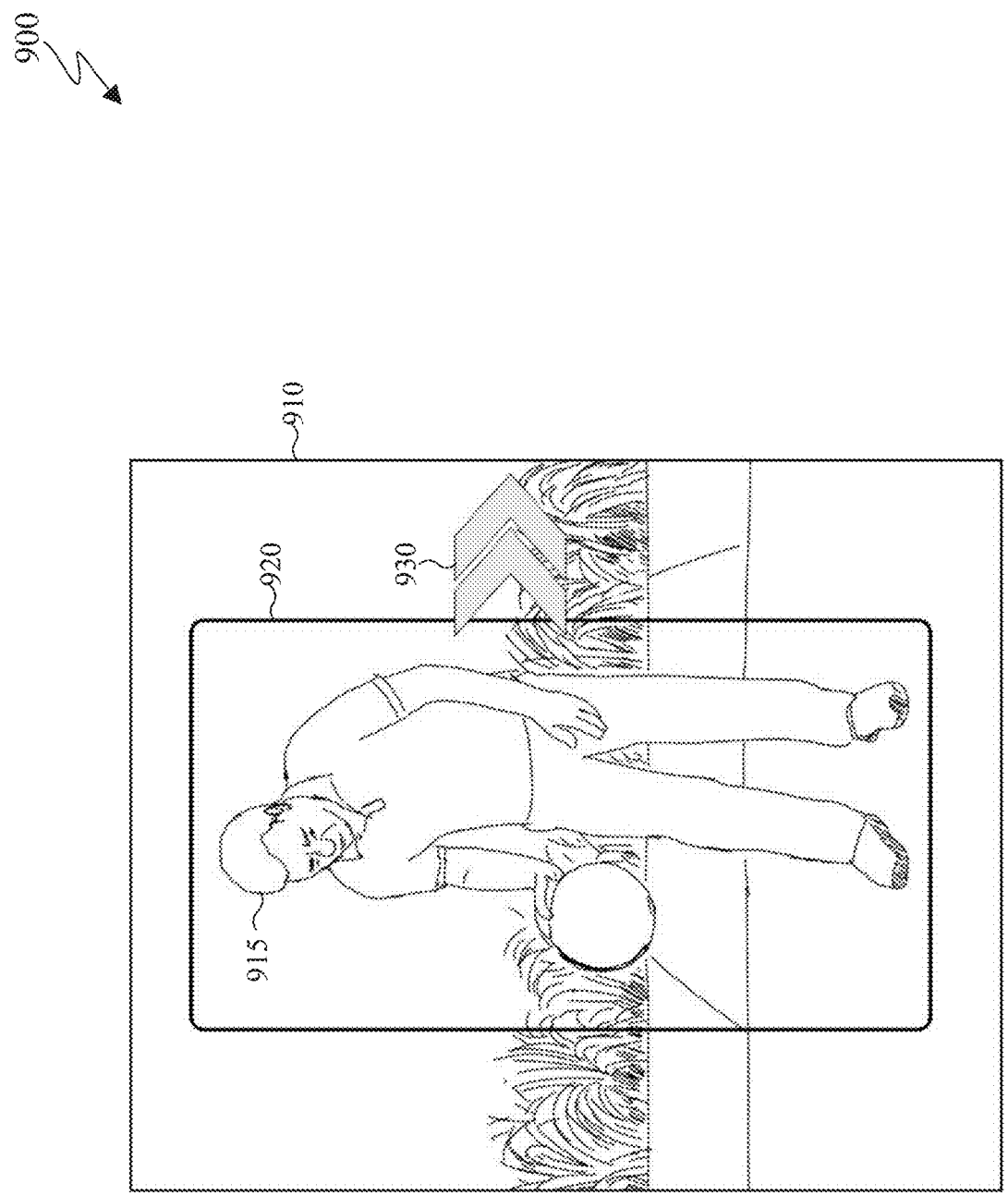

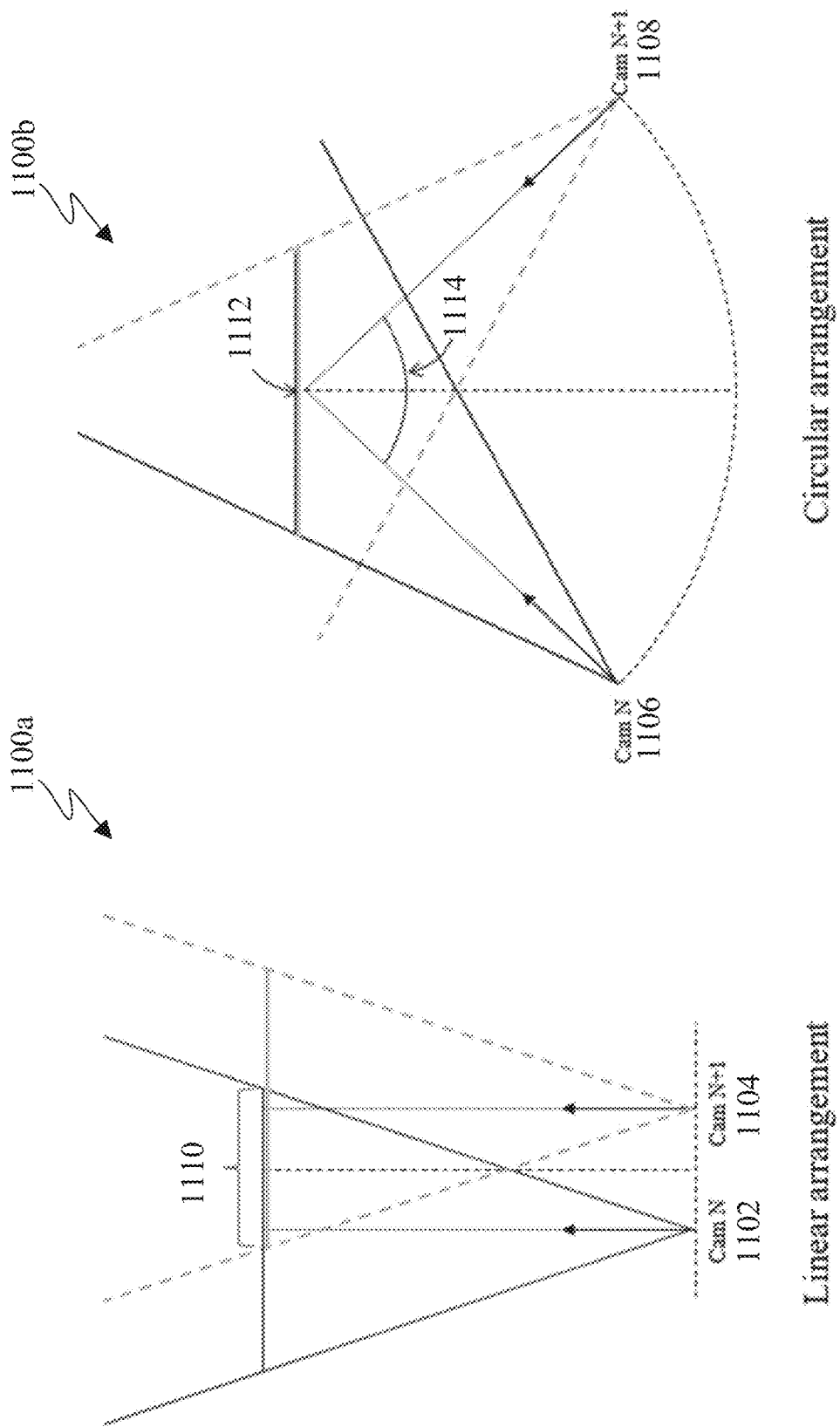

GENERATION AND DISTRIBUTION OF IMMERSIVE MEDIA CONTENT FROM STREAMS CAPTURED VIA DISTRIBUTED MOBILE DEVICES

CROSS-REFERENCE TO RELATED APPLICATION AND CLAIM OF PRIORITY

This application claims priority under 35 U.S.C. § 119(e) to U.S. Provisional Patent Application No. 63/055,658 filed on Jul. 23, 2020 and U.S. Provisional Patent Application No. 63/183,992 filed on May 4, 2021. The above-identified provisional patent applications are hereby incorporated by reference in their entirety.

TECHNICAL FIELD

This disclosure relates generally to multimedia content. More specifically, this disclosure relates to generation and distribution of immersive media content from crowdsourced streams captured via distributed mobile devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing.

Virtual reality experiences are becoming prominent due to recent innovations and products related to three dimensions (3D) and immersive media, such as content capture, processing, and distribution. For example, 360° video is emerging as a new way of experiencing immersive video due to the ready availability of powerful handheld devices such as smartphones. 360° video enables immersive "real life," "being there" experience for consumers by capturing the 360° view of the world.

Recording of events is often limited to a single user capturing an event on a personal device or multiple contemporary recordings by different devices. These recordings are unable to recreate immersive experience due to the limited number of viewpoints. Alternatively, specialized and dedicated rigs with dozens of cameras that are positioned around a perimeter of a stadium or another event can be used for capturing and providing 3D immersive contents and services like 3D replay, 360 replay, and multi-perspective videos of sporting events and concerts in near real-time. The 3D content that is captured by the detected rigs is often for use in applications such as games, movies, and other immersive media applications. Since these dedicated rig are fixed-installations, these rigs (content-capture systems) lack the ability to be anytime, anywhere and fail to capture spontaneous events. Moreover, these rigs cannot be used for small-scale personal events such as birthday parties and wedding ceremonies.

SUMMARY

This disclosure methods and apparatuses for generating and distributing immersive media content from crowd-sourced streams captured via distributed mobile devices.

In one embodiment, an electronic device for generating content is provided. The electronic device includes a transceiver and a processor. The processor is configured to receive information regarding electronic devices respectively capturing content associated with an event. The processor is also configured to identify, based on the received information, one or more parameters for the electronic devices to use in capturing the content, the one or more parameters identified to assist in generating multi-view content for the event from the captured content. The processor is further configured to identify, based on the received information, a common resolution for the electronic devices to use in capturing the content. Additionally, the processor is configured to identify, based on the received information, a common frame rate for the electronic devices to use in capturing the content. The processor is also configured to send information indicating the one or more parameters, the common resolution, and the common frame rate to the electronic devices.

In another embodiment, a method for generating content is provided. The method includes receiving information regarding electronic devices respectively capturing content associated with an event. The method also includes identifying, based on the received information, one or more parameters for the electronic devices to use in capturing the content, the one or more parameters identified to assist in generating multi-view content for the event from the captured content. The method further includes identifying, based on the received information, a common resolution for the electronic devices to use in capturing the content. Additionally, the method includes identifying, based on the received information, a common frame rate for the electronic devices to use in capturing the content. The method also includes sending information indicating the one or more parameters, the common resolution, and the common frame rate to the electronic devices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a user interface (UI) of an electronic device while capturing media in accordance with an embodiment of this disclosure;

FIGS. 11A and 11B illustrate example field of view overlaps in various arrangements in accordance with an embodiment of this disclosure;

DETAILED DESCRIPTION

Figure 1:
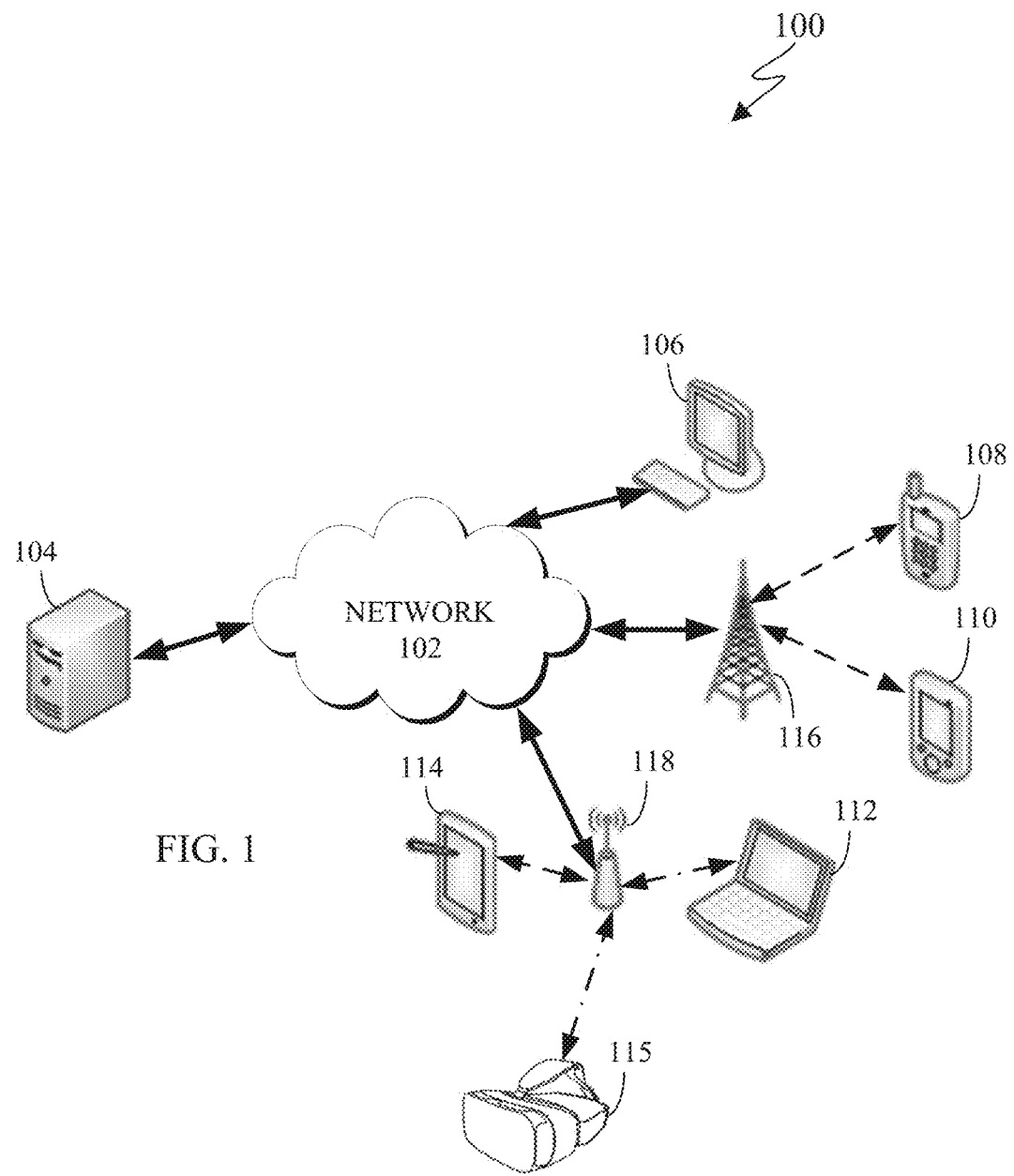
FIG. 1 illustrates an example communication system in accordance with an embodiment of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (TIMID). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

As discussed above, specialized and dedicated rigs for capturing 3D content often use several dozen cameras and tend to be at fixed locations. Therefore, embodiments of the present disclosure provide systems and methods for enabling persons with electronic devices (such as a smart phone) to facilitate collaborative creation of immersive contents of live events from small-scale events to spontaneous events, as well as to big sporting and entertainment events (such as concerts and other shows). For example, embodiments of the present disclosure leverages wireless technologies (such as 5G, WiFi, and ultra-wide band (UWB)), AR/VR, and artificial intelligence (AI) to facilitate on-demand crowdsourced immersive content creation and distribution.

Embodiments of the present discloser provide on-demand crowdsourced immersive content creation and distribution by enabling persons with electronic devices, such as smartphones, to collaboratively create immersive media contents (free viewpoint videos) of live events. Live events can include from small-scale events, spontaneous events, large commercial events (such as sporting events), and the like. this disclosure combines the video and audio streams captured synchronously by distributed electronic devices around any event, generates immersive content and spatial audio, and delivers it to smartphones and potentially fixed devices (such as smart TVs, desktop computers, portable devices (such as a smart phone, laptop, tablet) and the like) for live immersive and interactive viewing wherever and whenever.

Embodiments of the present disclosure take into consideration wireless synchronization of video captures for multiple randomly distributed portable devices (such as smartphones) that capture the same even. Embodiments of the present disclosure also take into consideration pose (localization and orientation) of the mobile devices capturing the same event. Embodiments of the present disclosure further take into consideration real-time (AI-based or non-AI-based) multi-view video processing and view synthesis from video streams captured by unstructured and un-calibrated devices as well as a wide-variety of devices. Additionally, embodiments of the present disclosure take into consideration real-time spatial audio reconstruction from multiple streams of audio captured by distributed mobile devices around an event. Embodiments of the present disclosure also take into consideration multi-view video and audio compression.

Accordingly, embodiments of the present disclosure relates to a framework for generating and distributing immersive content captured using multiple distributed and unorganized devices (such as smartphone cameras and drones with suitable recording equipment as well as organized devices such as fixed devices (fixed cameras installed at specific locations). This disclosure describes methods and apparatuses for generating and distributing immersive media contents such as multi-view or multi-perspective images/videos, 360° videos, six degrees of freedom (6DoF) assets, and spatial audio from on-demand, crowdsourced video, audio, and metadata streams captured by people using their mobile devices such as smartphones. Therefore, embodiments of the present disclosure enable multiple users to create immersive content of a live event using personal devices, such as their smartphone. The captured content can then be viewed live or at a future time for a "being there" experience.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate internet protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display (HID), or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can generate the immersive content that is captured by one or more of the client devices 106-116.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more animated scans. The HMD 116 can display a 360° scene of immersive content that is captured by multiple devices In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to generate the immersive content and transmit the content to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D generate the immersive content, transmit the immersive content, receive and render generate the immersive content, or a combination thereof. For example, the mobile device 108 can capture video of an event and transfer the video to another client device or to a server (such as the server 104) to generate immersive content.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
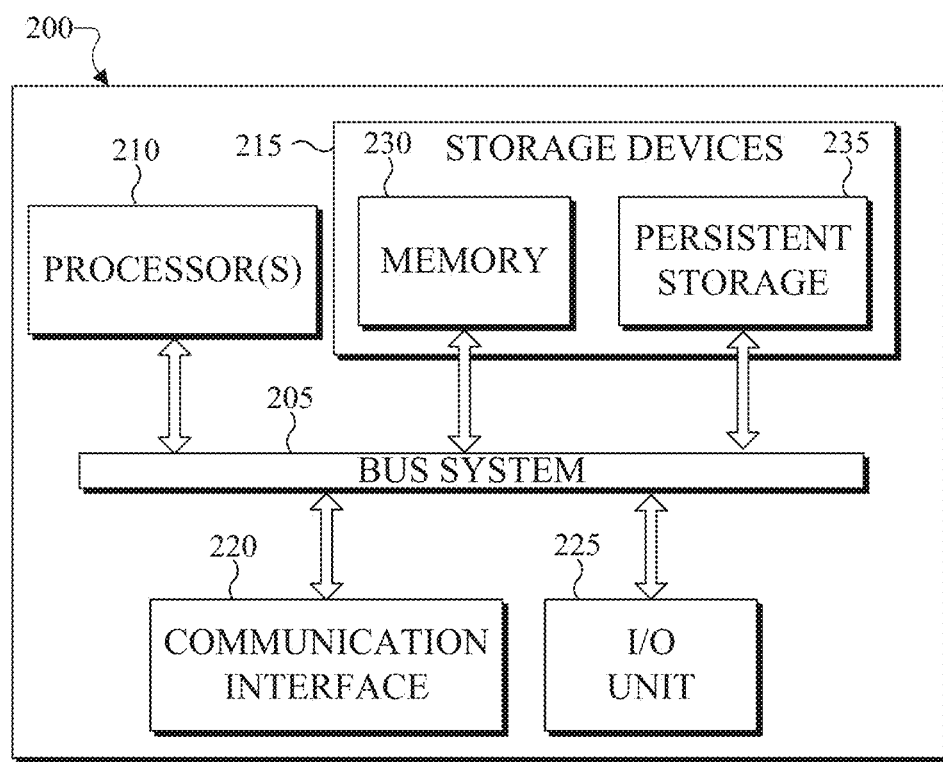
FIGS. 2 and 3 illustrate example electronic devices in accordance with an embodiment of this disclosure.
Figure 3:
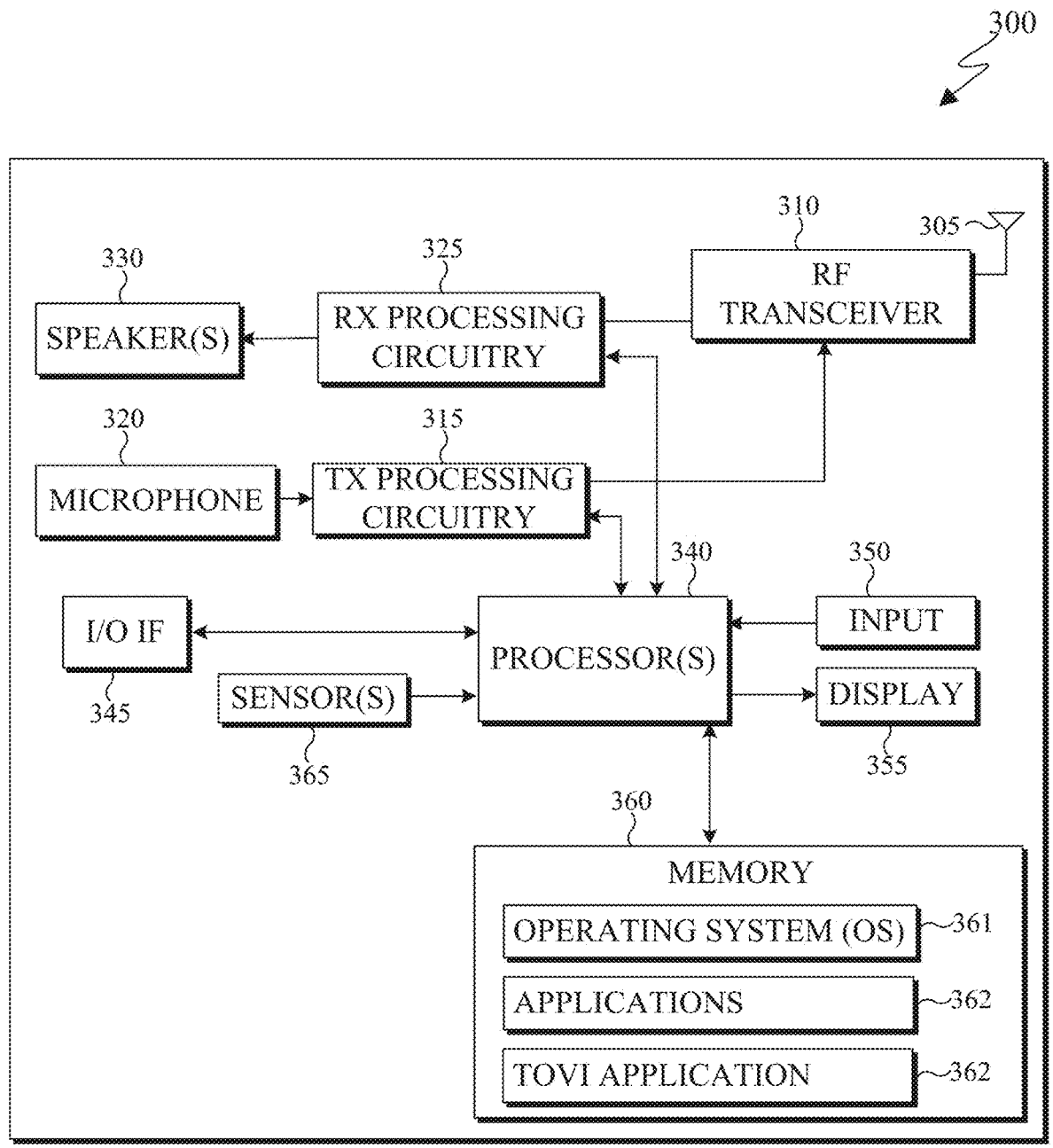

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, one or more media processing services, or one or more encoding servers. As shown in FIG. 2, the server 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can combine various streams of media of the same event to create an immersive content.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for creating immersive content from multiple data streams. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit immersive content to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is captures content of an event. For example, the electronic device 300 is usable with data transfer, capturing content based on various parameters, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, one or more applications 362, and a TOVI application 363.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include a VR or AR application, a camera application (for still images and videos), a video phone call application, an email client, a social media client, a SMS messaging client, a virtual assistant, and the like. In certain embodiments, the processor 340 is configured to capture media content, receive media content, transmit media content or a combination thereof.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects and immersive content.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, immersive content, and the like.

The memory 360 can also include TOVI application 363. The TOVI application 363 can be used to change various parameters and settings of a camera in order to synchronize the parameters and settings with other electronic devices. The TOVI application 363 can also be used for generating the immersive video content. Additionally, the TOVI application 363 can be used for rendering an immersive media content that is transmitted from another device. In certain embodiments, the TOVI application 363 can include a signaling manager operation (such as the signaling manager 422 of FIGS. 4A and 4D and the signaling manager operation 422a of FIG. 4D) and a transaction manager operation (such as the transaction manager 424 of FIGS. 4A and 4D and the transaction manager operation 424a of FIG. 4D).

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor/camera), a depth sensor, a D-RGB sensor (depth Red Green Blue sensor/camera), and the like. The sensor 365 can further include control circuits for controlling any of the sensors included therein.

As discussed in greater detail below, one or more of these sensor(s) 365 may be used to control a user interface (UI), detect UI inputs, determine the orientation and facing direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
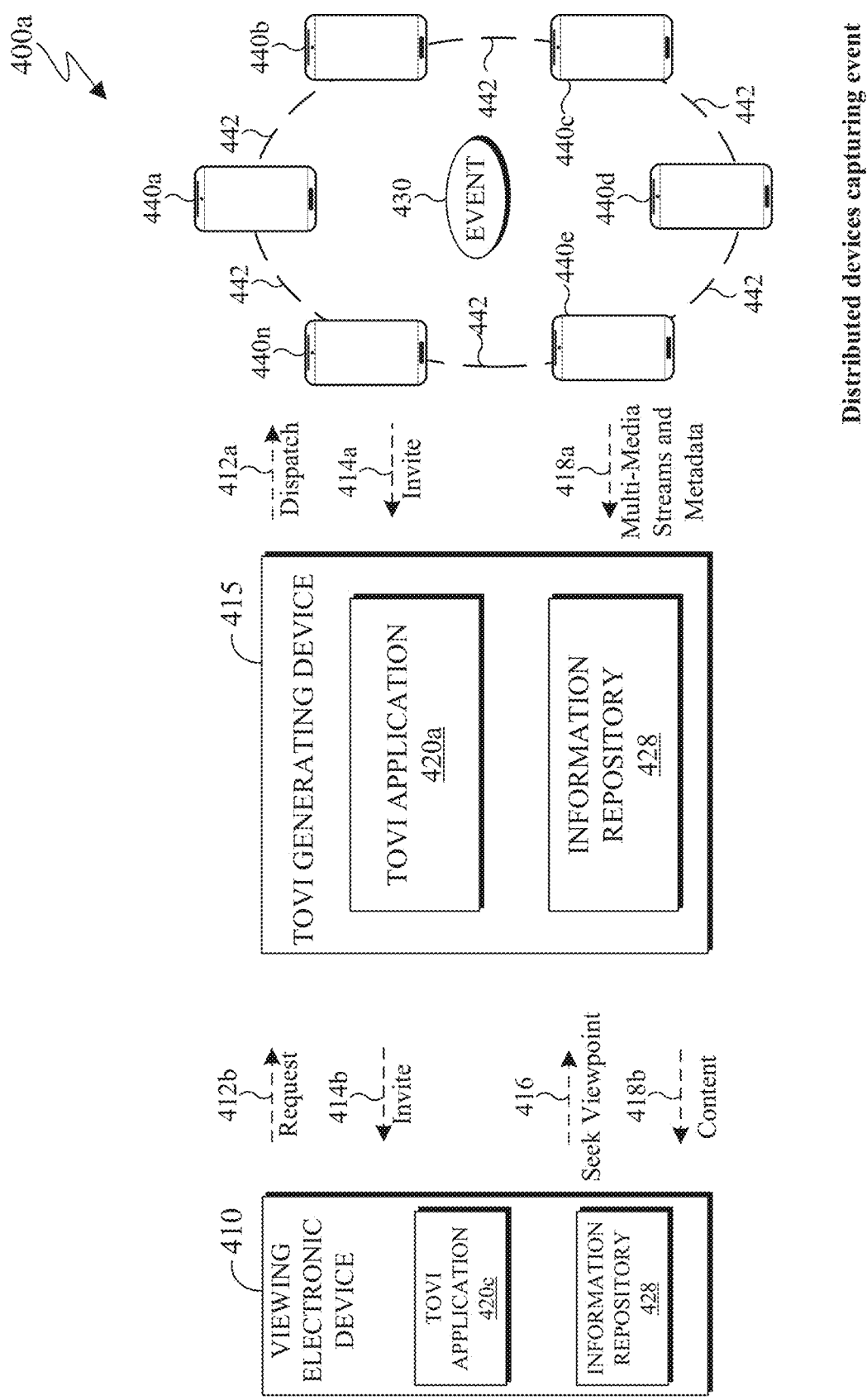
FIGS. 4A, 4B, and 4C illustrate various environments for generating and distributing immersive media content from crowdsourced streams captured in accordance with an embodiment of this disclosure.
Figure 4B:
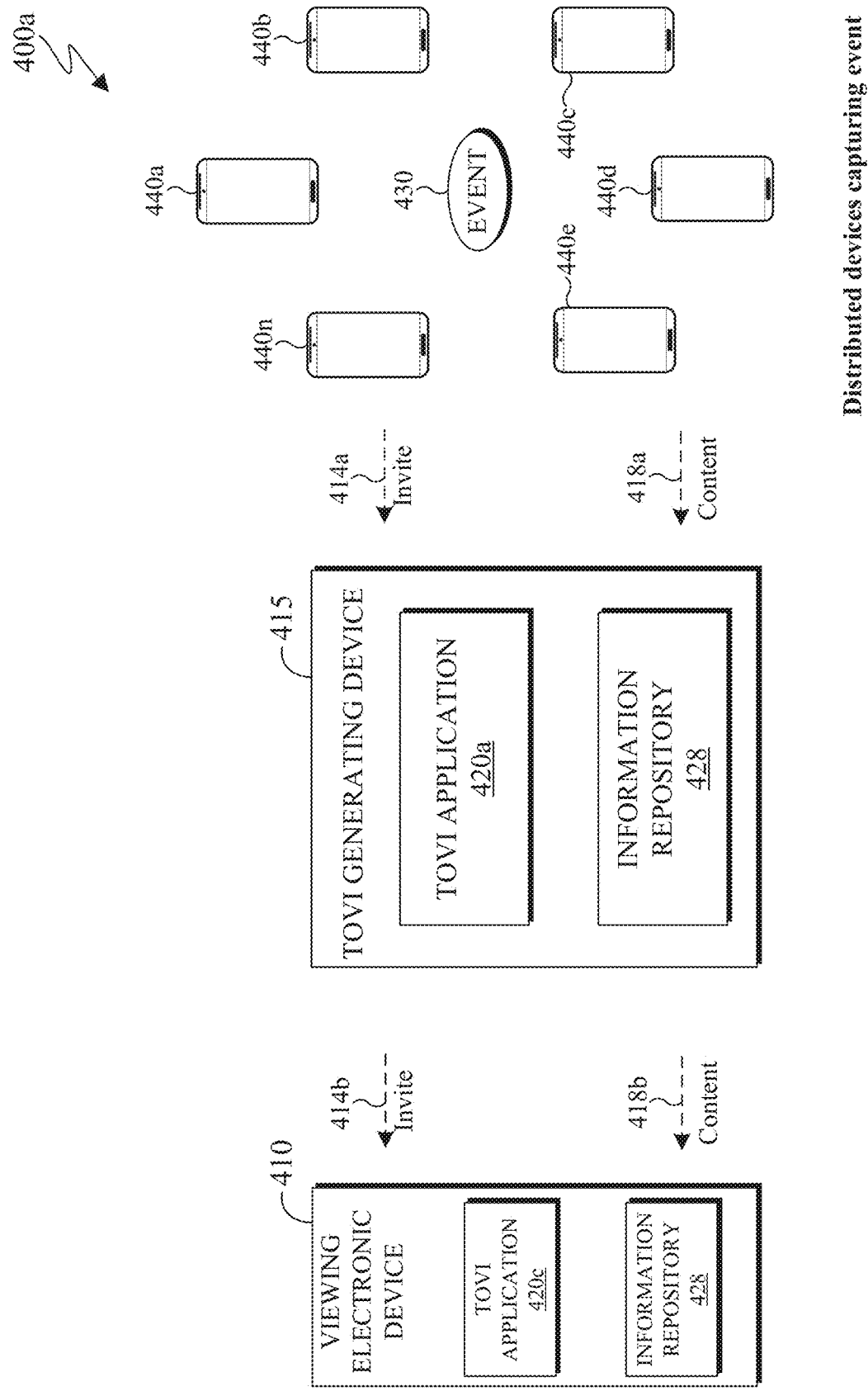
Figure 4C:
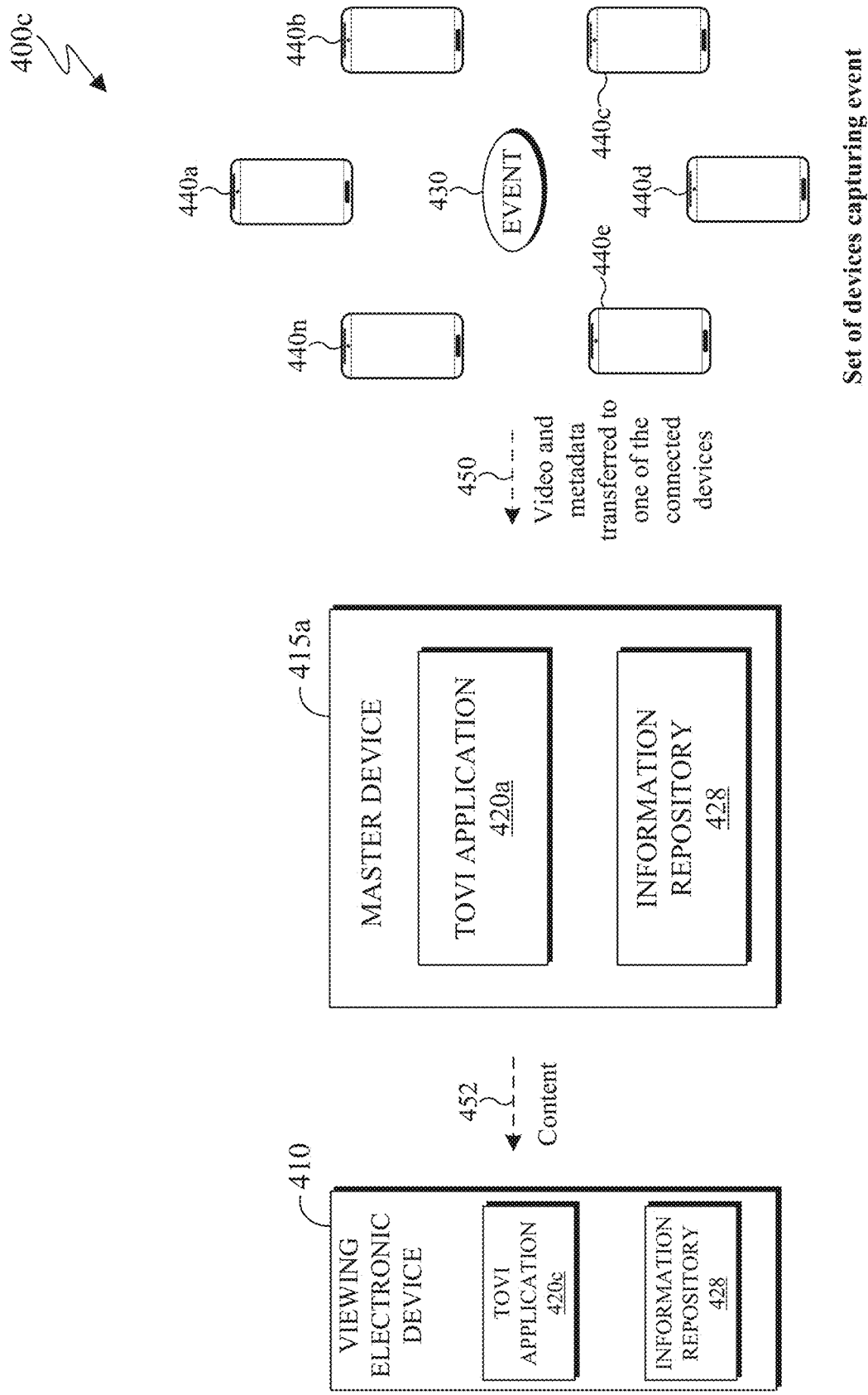
Figure 4D:
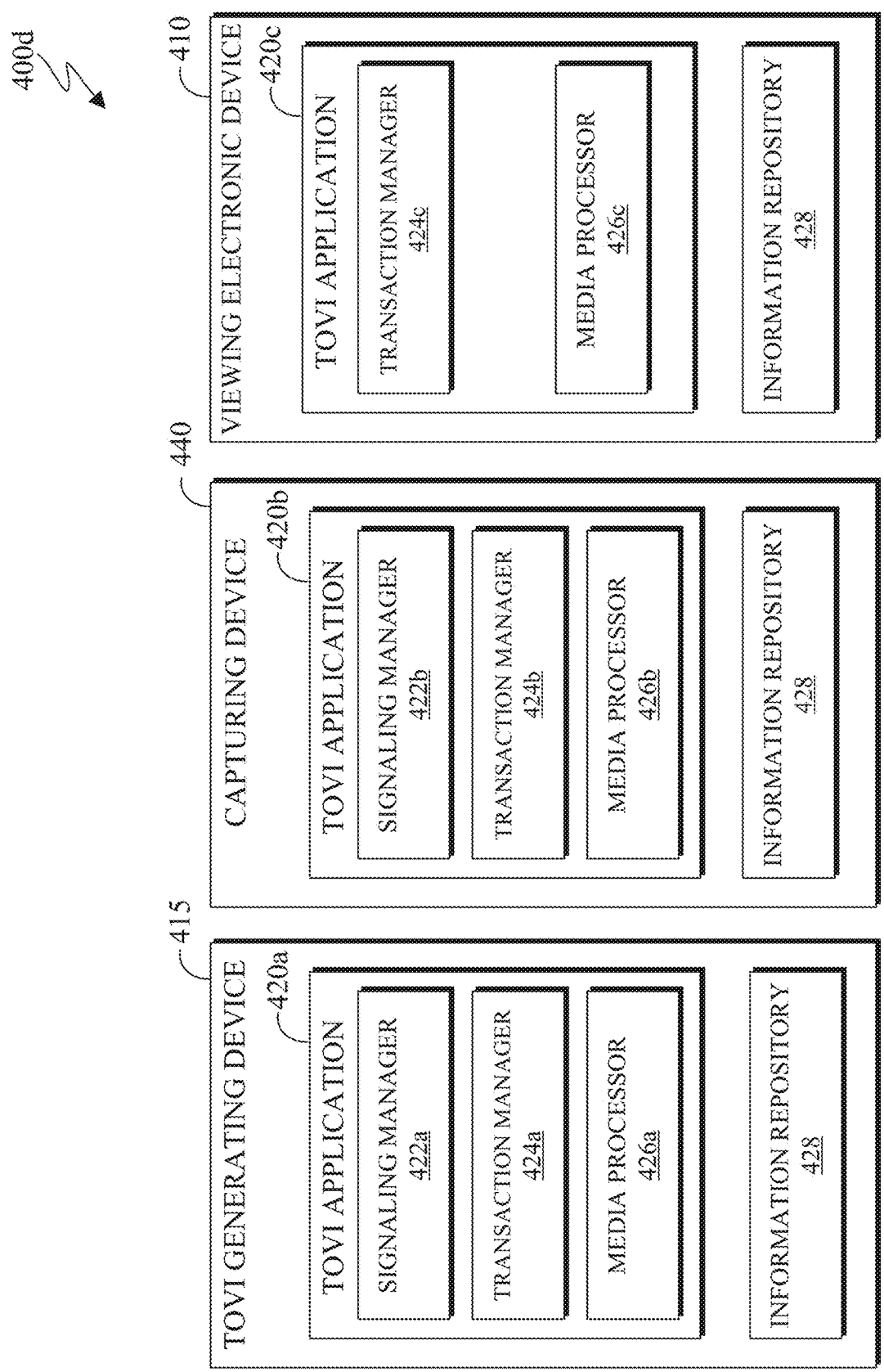
FIG. 4D illustrates a block diagram of various operations performed by the devices of FIGS. 4A, 4B, and 4C in accordance with an embodiment of this disclosure.

FIGS. 4A, 4B, and 4C illustrate environments 400a, 400b, and 400c, respectively, for generating and distributing immersive media content from crowdsourced streams captured in accordance with an embodiment of this disclosure. FIG. 4D illustrates a block diagram 400d of operations performed by the devices of FIGS. 4A, 4B, and 4C in accordance with an embodiment of this disclosure. The devices of FIGS. 4A, 4B, 4C, and 4D could be similar to any of the client devices 106-116 of FIG. 1 or the server 104 of FIG. 1 and can include internal components similar to that of server 200 of FIG. 2 and the electronic device 300 of FIG. 3.

The environment 400A, 400B, and 400C of FIGS. 4A, 4B, and 4C, respectively, illustrate various embodiments of a Tele Omni View (TOVI) system for generating and distributing immersive media content from multiple devices. The TOVI system includes multiple electronic devices such as a viewing electronic device 410 (as shown in FIGS. 4A, 4B, 4C, and 4D) a TOVI generating device 415 (as shown in FIGS. 4A, 4B, and 4D), multiple capturing device 440a through 440n (also referred to as a capturing device(s) 440 and shown in FIGS. 4A, 4B, 4C, and 4D). The TOVI system can include a master device 415a (as shown in FIG. 4C) instead of the TOVI generating device 415. The master device 415a represents a capturing device (such as the capturing device 440a) that is performing the functions of the TOVI generating device 415. The TOVI generating device 415 can be a standalone device, multiple devices, a remote server, or a cloud based system.

The viewing electronic device 410 of FIGS. 4A, 4B, and 4C includes a TOVI application 420c, which is described in greater detail in FIG. 4D. The TOVI generating device 415 of FIGS. 4A, 4B, and 4C includes a TOVI application 420a, which is described in greater detail in FIG. 4D. The capturing device 440 of FIGS. 4A, 4B, and 4C includes a TOVI application 420b, which is described in greater detail in FIG. 4D. Additionally, the viewing electronic device 410, TOVI generating device 415, and the capturing devices 440 of FIGS. 4A, 4B, and 4C include an information repository 428.

The information repository 428 can be similar to memory 260 of FIG. 2 or the memory 360 of FIG. 3. The information repository 428 represents any structure(s) capable of storing and facilitating retrieval of information (such as data, program code, or other suitable information on a temporary or permanent basis). The information repository 428 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc. In certain embodiments, the information repository 428 is a dedicated standalone storage typical of a physical network function or cloud storage. The information repository 428 can store various streams from the capturing devices 440. The information repository 428 can also include immersive content that was generated by the TOVI generating device 415.

Some of the electronic devices of FIGS. 4A, 4B, and 4C are used for capturing content and referred to as capturing devices 440 (or video generating devices) while other devices are used for viewing the content and referred to as video consuming devices or viewing electronic devices 410. In certain embodiments, some of the electronic devices that are used for capturing content can also be used for viewing the content. One of the electronic devices also generates the immersive media content from the capture content of the capturing devices and referred to as a TOVI generating device 415 (a master device (such as the master device 415a of FIG. 4C), or a central processor (CP)). In certain embodiments, the electronic devices that generates the immersive media is one of the capturing devices and referred to as a master device 415a. In other embodiments, the electronic devices that generates the immersive media is a remote server, such as the server 200 of FIG. 2.

One or more of the electronic devices of the environment 400A, 400B, and 400C of FIGS. 4A, 4B, and 4C, respectively, are associated with users. The users of the electronic devices can be content-consumers, content-producers, or both content-consumers and content-producers. Content-consumers are individuals that consume and experience the generated immersive contents, while content-producers are individuals that capture content such as videos, images, and audio. Users can access the TOVI system through an application, such as the TOVI application 420a, 420b, 420c (which can be similar to the 363 of FIG. 3) that is launched on each of the electronic devices (also denoted as a terminal device). Depending on the function the electronic device is performing (such as whether the electronic device is generating the immersive content (such as the TOVI generating device 415), capturing the content (such as the capturing device 440), or rendering the content for viewing (such as the viewing electronic device 410) indicates which version of the TOVI application is being executed on the specific device. FIG. 4D, below describes the various components of the TOVI application.

An electronic device is any device that transmits signals, receives signals, or both transmits and receives signals. Examples of electronic devices at the content-consumers' end could be personal smartphones (such as the mobile device 108 of FIG. 1), tablets, HMDs (such as the HMD 116 of FIG. 1), TVs, autostereoscopic multi-view displays, and the like. The electronic devices at content-producers' end are usually any personal wireless mobile device with a camera such as smartphones (such as the mobile device 108 of FIG. 1), tablets (such as the tablet computer 114 of FIG. 1), hand-held cameras, drones with cameras, and the like. The system provides access and various features via a suitable (or tiered) subscription model.

Embodiments of the present disclosure describe four possible modes for capturing, generating and distributing immersive content. In each of the modes, one or more capturing devices 440a through 440n (collectively capturing device(s) 440) are positioned at or around an event and capture video or images of the event. For example, the capturing devices 440a through 440n are synced 442 such as by using a similar clock for capturing content of the event 430. Additionally, in each of the modes, one device is designated as the TOVI generating device 415 (or the master device, which is when one of the capturing devices 440 acts as both a capturing device and as the TOVI generating device 415). In certain embodiments, one of the capturing devices (such as the capturing device 440a) both captures content and performs the functions of the acts as TOVI generating device 415 (referred to as master device). In other embodiments, another device, such as a remote server is the TOVI generating device 415. Further, in each of the four modes, a viewing electronic device 410 renders and displays the immersive video that is captured content from the more capturing devices 440a through 440n and generated by the TOVI generating device 415 for a content consumer to viewing.

The environment 400a of FIG. 4A illustrates a first mode for capturing, generating and distributing immersive content. As shown in FIG. 4A, one or more of the capturing devices 440a through 440n generate content by capturing videos or images of the event 430. The capturing devices 440a through 440n transfer the various content 418a (including multimedia content and metadata) to the TOVI generating device 415 for generating the immersive content. In certain embodiments, the TOVI generating device 415 is one of the capturing devices 440a through 440n. In another embodiment, the TOVI generating device 415 is a remote device such as the server 200 of FIG. 2.

In certain embodiments, one or more content-consumers, via the viewing electronic device 410 can request 412b that content be streamed from a live event 430. Upon the TOVI generating device 415 receiving the request 412b, the TOVI generating device 415 can identify devices that are located at the event 430 and dispatch 412a the request 412b to the identified devices (such as the capturing devices 440a through 440n) for capturing content. The content requester will be able to see the available content-generators (such as the capturing devices 440a-440n) around the event-site, and the potential Quality of Service (QoS) that the system can provide at that time. Then, if the user of the viewing electronic device 410 decides to view the content, the user clicks a button on the viewing electronic device 410 to start streaming the immersive content 418b. Alternatively, any of the of capturing devices 440a through 440n can invite 414a the viewing electronic device 410 to view the immersive content. Once the immersive content 418b starts streaming, the user of the viewing electronic device 410 can interact with the content, depending on the available level of immersiveness (for example, multi-perspective, outside-in 360°, inside-out 360°, windowed 6DoF (Degrees of Freedom), volumetric video, or fully 6DoF visual and audio) in the content via the user interface provided by the application. As an example, the content consumer can freely change the viewpoint 416 by sliding her finger or a stylus over the display of the viewing electronic device 410 or changing the pose (position) of their head when wearing an HMD (such as the HMD 116 of FIG. 1). Since there are several possibilities of immersive video depending on the configuration of the capturing devices 440 at the time of capture, all such generated contents can be referred to as TOVI video, representing the ability of the content consumer to see multiple viewing directions remotely.

The environment 400b of FIG. 4B illustrates a second mode for capturing, generating and distributing immersive content. As shown in FIG. 4B, one or more users from a group of content-producers (capturing devices 440a-440n) capturing a live event can invite 414a one or more local or remote users (such as the viewing electronic device 410) to view the content. For example, one or more of the capturing devices 440a-440n transmits an invite 414a, for inviting viewing electronic device 410, to the TOVI generating device 415. Thereafter, the TOVI generating device 415 transmits the invite 414b to the viewing electronic device 410a.

Depending upon the proximity of local users, device-network-device or device-to-device (D2D) communications may be utilized for local users. Once the local or remote user receives the invitation notification 414b, the user may choose to immediately view the live TOVI video or store it for later viewing. Furthermore, the content can be stored either in a memory, such as the information repository 428 of the of the viewing electronic device 410 or the TOVI generating device 415. The information repository 428 can be a cloud storage space.

In certain embodiments, certain information can be transferred using D2D communications instead of using device-network-device communications when users participating in the capture in close proximity. For example, information that is related to synchronization (such as reference time) can be transmitted via D2D. For another example, information that is related to captures (such as exposure time) can be transmitted via D2D.

The environment 400b of FIG. 4B also illustrates a third mode for capturing, generating and distributing immersive content. In the third mode capturing, generating and distributing immersive content, a group of users can use their personal electronic devices to record an event together, and send the various content 418a streams to the TOVI generating device 415. The TOVI generating device 415 then generates immersive content from the various content 418a streams. Thereafter the TOVI generating device 415 can store (via the information repository 428) immersive content for offline or after-the-fact viewing, via immersive content 418b.

The environment 400c of FIG. 4C illustrates a fourth mode for capturing, generating and distributing immersive content. In the fourth mode of operation, a user with multiple capturing devices 440a through 440n (such as multiple mobile devices 108 of FIG. 1 or tablet computers 114 of FIG. 1) setups a local wireless network (such as by using a Wi-Fi network) and designate one of the capturing devices 440 as the master device 415a. The master device 415a is similar to the TOVI generating device 415 of FIGS. 4A and 4B. The user may content 418a (including capture videos and metadata) of an event using the network of capturing devices 440a through 440n placed around the subject or event. Following the capture, the user may use the TOVI application 420a in the master device 415a to generate a TOVI multi-view video. Furthermore, the user may also share the content 418d of the immersive video with other devices, such as the viewing electronic device 410.

In all four modes of operation, described above, users can pre-plan and organize a collaborative capture of a future event. For example, users can register an event by designating an event name, time, location, and the like. The users can also invite other members to join the collaborative capture session. For example, users can invite others to join the collaborative capture session by posting information of the event on social media boards and In certain embodiments, the crowdsourced streaming system (the TOVI system) is an over-the-top (OTT) service, an IP Multimedia Subsystem (IMS) based service, a special non-OTT and non-IMS service (a proprietary or custom operator service), and the like. Furthermore, from content consumption perspective, the TOVI system may provide both live streaming and Video on Demand (VOD) streaming services to content-consumers.

In the live streaming mode, the TOVI system generates the TOVI video from the multiple separate video streams from a live event and delivers it to the content-consumers' devices in near real-time following some delay (latency). The amount of latency is governed by several parameters including but not limited to the configuration of the content delivery network (CDN), the streaming protocol (RTMP, HLS, MPEG-DASH, SRT, CMAF, WebRTC, and the like), network congestion, and the like. Therefore, one or a combination of streaming protocols which is advantageous for low-latency streaming may be used by the TOVI service. For example, the TOVI service may employ SRT streaming for content acquisition and WebRTC for distribution of the TOVI video to the content consumers for live streaming.

In certain embodiments, the original video streams and the generated TOVI video may be recorded (stored) in the information repository 428 of the TOVI generating device 415 during the live streaming. In other embodiments, the content generators may choose to directly record the videos and generate the TOVI video without live streaming. The recorded TOVI video can be latter streamed to the content consumer(s) when to view the content using a VOD streaming service.

Content generators may choose to share the TOVI video publicly with all users of the service or with only a specific subset of users in their friend network. Content consumers may view the publicly shared TOVI videos through the TOVI system. In certain embodiments, the viewable TOVI videos are presented to the users in a gallery format. Furthermore, the TOVI videos may be organized in the gallery based on event information, date, popularity, genre, and the like.

The block diagram 400d of FIG. 4D, describes the various internal components and operations of electronic devices of FIGS. 4A, 4B, and 4C. For example, the TOVI application 420a of the TOVI generating device 415 includes a signaling manager operation 422a, a transaction manager operation 424a, and a media processing operation 426a. Similarly, the TOVI application 420b of any of the capturing devices 440 includes a signaling manager operation 422b, a transaction manager operation 424b, and a media processing operation 426b. Additionally, the TOVI application 420c of any of the viewing electronic devices 410 includes a transaction manager operation 424c, and a media processing operation 426c.

The signaling manager (SM) operation 422a of the TOVI generating device 415 includes (i) a signaling hub and (ii) a synchronization hub. The SM operation 422b of the capturing device 440 includes a signal handler. As described in greater detail below, the capturing devices 440 at the event 430 are synchronized during the collaborative content capture. The SM operation 422a of the TOVI generating device 415 manages some of the configuration and sync-related signaling for different operating modes and the application features.

The transaction manager (TM) operation 424a of the TOVI generating device 415 includes (i) a request hub, (ii) an authentication hub, and (iii) a payment hub. The TM operation 424b of the capturing device 440 includes a request handler. Similarly, the TM operation 424c of the viewing electronic device 410 includes a request handler.

The media processing (MP) operation 426a of the TOVI generating device 415 includes (i) a capture controller and (ii) a multi-view video reconstruction operation. The MP operation 426b of the capturing device 440 includes a capture controller. The MP operation 426c of the viewing electronic device 410 includes a view dependent multi-view video renderer.

Although the components of the TOVI generating device 415 can communicate with each other, the components are not restricted to reside on the same physical computer or physical network. Indeed, the several tasks of SM operation 422a, the TM operation 424a, and the MP operation 426a can be carried out across several distributed processing units. More specifically, the platform can be realized as a centralized service such as those typically offered by IMS, a distributed or edge service such as those typically offered by Edge Computing or Multi-access Edge Computing (MEC), or a hybrid centralized and edge implementation, where some functionalities reside in a centralized entity and other functionalities reside in distributed data centers, and the like. It is noted that, the use of MEC can reduce the end-to-end latency and provides better user experience. An application can be one of the MEC applications and can exploit any Radio Access Network (RAN)-specific information for enhanced QoS management.

For example, when only a small number of the capturing devices 440 are used for collaborative capture, the components of the TOVI application 420a can be implemented using the TOVI application 420b on each individual capturing device 440. In such scenarios, the wireless synchronization messages are exchanged directly between the capturing devices 440 over the available wireless network without passing through an intermediate server. This this scenario, the TOVI generating device 415, can be omitted.

In certain embodiments, a custom network slice is created to meet the target QoS, because the standard network slices of eMBB and URLLC may not be suitable for the target immersive experience. For example, a suitable network slice may be defined in future by the 3GPP standards body if such slice meets the QoS requirements.

In certain embodiments, a content delivery network (CDN) forms the backbone for distribution of assets to the network edge. Examples of assets could be the reconstructed TOVI video, surround audio, metadata, and other contents embedded into the stream by one or more processing servers. When responsiveness to user interaction with content is important, examples of assets could be partially processed video (alignment of frames, generation of interpolated frames to provide a smooth transition of viewpoints, and improving timing synchronization accuracy) from multiple viewpoints, one or more audio streams, and metadata optimally packed into a composite stream that is delivered to the content-consumer's terminal device. Following the decoding of the streams, the processing capability of the terminal device is utilized for the generation of the TOVI video.

In certain embodiments, the TOVI application 420a is executed on any of the client devices, such as a mobile device 108. It is noted that one of the electronic devices during a collaborative capture is assigned as the master device (similar to the master device 415a of FIG. 4C), which is responsible for initiating and choreographing the synchronized capture, and for processing the captured video and audio streams to generate TOVI video. During content capture, the TOVI application 420a running on the master device (or the TOVI generating device 415) includes functions for initiating and managing synchronization, managing requests and authentications, initiating and controlling capture, and immersive content reconstruction enabled. In contrast, fewer functions are enabled in the other electronic devices (such as any of the capturing devices 540 that are not designated as the master device 415a or the viewing electronic device 410) during capture. Furthermore, only the functions required for viewing and interacting with the immersive content are enabled in the TOVI application 420c on the viewing electronic device 410.

The Request hub of the TM operation 424a of the TOVI generating device 415, manages requests for seeking contents and invites for sharing or pushing contents between content-consumers and content-producers during a session. For example, when a user requests to view immersive content from an event 430 via the TOVI application 420c, the request is sent to the request hub of the TM operation 424a of the TOVI application 420a. To process the request, the request hub communicates with the authentication hub of the TM operation 424a of the TOVI application 420a to authenticate the user, who initiated the request. The authentication hub also determines the geo-location of the event 430, then determines the number of users (of the TOVI application 420b) at the vicinity of the event 430 who are either already streaming the live event to the TOVI generating device 415 or who are willing to do so upon request. In certain embodiments, the authentication hub includes a database and storage to encrypt and store user related information.

Following authentication, the Request hub dispatches the request to capturing devices 440 associated with users (content-generators) near the event 430 to stream contents from the event-site. Upon receiving acknowledgements from the capturing devices 440 associated with the content-generators who are already streaming (this acknowledgement could be automatic) and new content-generators from the event site, and other metadata such as pose of the sensors and resolution of sensors, the Request hub determines the baseline Quality of Service (QoS) that can be provided to the content-consumer. The Request hub sends the information about the baseline QoS and the fee/cost of service, if any, back to the viewing electronic device 410 of the potential content-consumer. If the potential content-consumer agrees to avail the service and accepts the service charge, a message to start streaming is sent from the TOVI application 420c in the content-consumer's terminal device to the Request hub of the TOVI application 420a. The Request hub sends the content-consumer's information to the Payment hub (of the TM operation 424a of the TOVI generating device 415) to process the payment. Then, the request hub dispatches the request to the capturing devices 440. In certain embodiments, the request hub also keeps track of capturing devices 440 (content-generators) and the time and quality of the content streamed by each device. The request hub can use this information to determine the compensation (either in monetary value or in reward points) to award a content-generator for providing content. These steps are described in FIG. 5, below.

For example, to aid and encourage collaborative content generation, a payment manager included in the TM operation can provide incentives to content generators. These incentives can be in the form of credits or cash for generating content based on the duration of content generated, type of event covered, and quality of the content generated. The credits can be used by the content generators for consuming future content generated which they are unable to attend. In addition to this, if the localization information from all the terminal devices covering the event shows sparse coverage of the event from certain regions, to boost the coverage from those regions, the payment manager can incentivize content generators to capture the event from the sparse regions. These incentives are multiples of the ordinary incentives with a value greater than one. The multiple can be determined on how important the coverage required is for providing the best QoS/QoE possible.

The content generators may be compensated-via cash, points, or rewards proportional to the popularity or the number views generated by the TOVI content. In live streaming scenarios, the compensation for the content generators may be determined using some statistics of the number of views during the live streaming and the amount of time, quality, and bitrate of the captured video and audio. For VOD streaming scenarios, the compensation for content generators may be determined by the total number of views of the immersive video over a period of time.

In certain embodiments, contextual advertisements may be embedded by the system during live and VOD streaming of contents.

In certain embodiments, for communication between the wireless network and the devices, a unicast transmissions is used. In other embodiments, broadcast/multicast transmissions is used for communication between the wireless network and the devices. The network may also dynamically switch between these two methods at a given instant.

The group of content-generators (using the capturing devices 440) surrounding the event 430 can form a wireless mesh network or receives assistance from the wireless network and the TOVI generating device 415 to coordinate and synchronize for collaboratively capturing videos/images of the event from their respective viewpoints. The multiple video/image streams, audio streams, and metadata streams from the randomly distributed capture devices (such as smartphones or handheld cameras) are sent back to the TOVI generating device 415. The TOVI generating device 415 manages the disparate incoming streams of data from the event-site. In certain embodiments, the SM operation 422a manages this information. In other embodiments, a dedicated functional unit is employed to manage this information. The detected functional unit could be part of the MP operation 426a.

Figure 6:
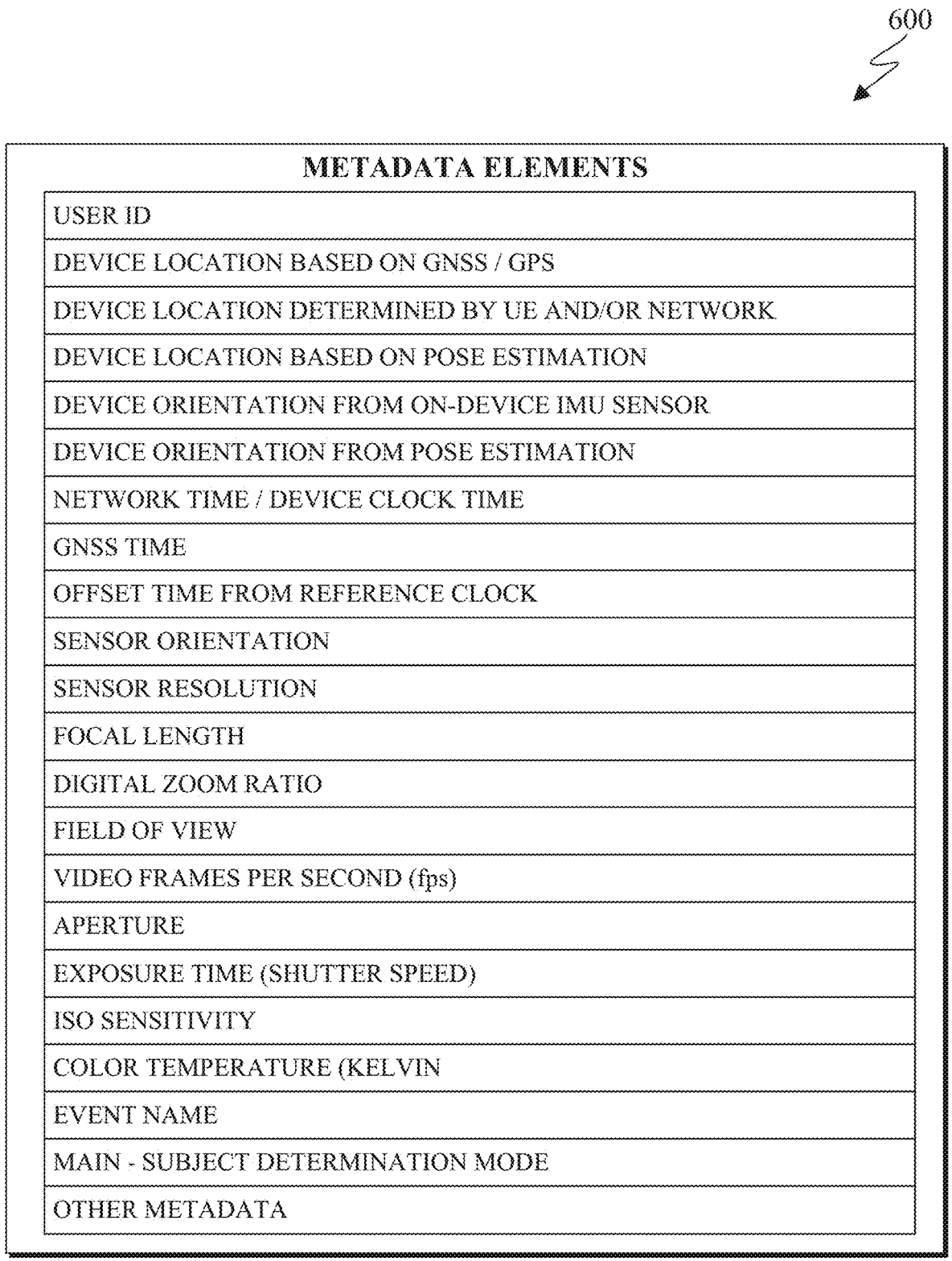
FIG. 6 illustrates an example table that includes metadata elements in accordance with an embodiment of this disclosure.

The metadata streams from the capturing devices 540 include various information. For example, the metadata from any of the capturing devices can include identifying information of the user and the device itself. The metadata can also include location information of the capturing device. The metadata can further include information related to the camera such as (i) sensor-resolution, (ii) pose (location and orientation), (iii) focal length (if available), (iv) field-of-view (if available), (v) video frames per second (fps), and the like. Additionally, the metadata can specify information about the event 430. A non-exhaustive list of metadata is shown in FIG. 6 and described below.

The MP operation 426a operation uses the metadata during the reconstruction of immersive content from the individual streams of data. The resulting reconstruction can have various levels of immersiveness that provides corresponding levels of Quality-of-Experience (QoE). At best, the reconstructed content provides truly 6DoF visual and spatial audio for a "be-there" experience. At the other end of the QoS/QoE spectrum, the reconstructed content is just a multi-perspective image with no audio. The level of immersiveness in the audio-visual content reconstructed by the MP operation 426a depends on the level of QoS determined. Finally, the TOVI application 420a provides the reconstructed immersive content to the viewing electronic device 410 for viewing by the content consumer.

Depending upon the level of QoS/QoE available and the type of viewing electronic device 410 used, the TOVI application 420c provides various user-interfaces that enable the content-consumer to interact with the content. For example, the user may drag her finger on a touch-sensitive display to change the viewpoint to see the scene from a different angle. The information about the requested viewpoint is transmitted from the viewing electronic device 410 to the TOVI generating device 415 via the seek viewpoint 416 of FIG. 4A. The TOVI generating device 415 then sends the requested rendered viewpoint along with rendered images from several neighboring viewpoints. The additional images can be based on a prediction of the future movements based on past movements. Alternatively, if the viewing electronic device 410 possesses adequate processing power for rendering on-device, a large portion of the processed and encoded data may be fetched (or downloaded) on the viewing electronic device 410, allowing the viewing electronic device 410 to decode the data, generate, and render the needed viewpoint. By downloading a large portion of content can minimize the latency between movements of the content consumer and the rendering of new viewpoints on the screen.

In certain embodiments, a baseline QoS is, at least, a function of the subscription level of the content-consumer (using the viewing electronic device 410), the different resolutions of the ensemble of the images/videos captured by content-generators (via the capturing devices 440), the pose and the density of smartphones capturing the event 430, the type of wireless network at the event site, and the network congestion at the time of request. If the resolution of the sensors and the density of capturing devices 440 are high, the quality of the reconstructed content is better. Similarly, the type of network also affects the bandwidth and latency. On the other hand, an increase in network congestion can increase the latency and inversely affect the experience. The expected QoS/QoE may be presented to the user both quantitatively and qualitatively using an annotated scale.

In certain embodiments, the messages and information passed between the TOVI applications 420*a*, 420*b*, and 420*c*, and the corresponding devices can be secured using one or more layers of security (such as, 5G Control Plane and User Plane security mechanisms for integrity protection, ciphering, and privacy and application layer security mechanisms).

In certain embodiments, the location of the capturing devices 440 can be estimated based on measurements of multiple Radio Access Technologies (RATs) in standalone or in an integrated manner (two or more RATs). Examples of these RATs include 5G, LTE, WiFi, UWB, Bluetooth, and an LTE or NR-based sidelink used in D2D communications. In certain embodiments, the capturing devices 440 that capture the event 430 can be part of a wireless local area network (WLAN) created by a local wireless router or created by one of the capturing devices hosting a hotspot network, or an ad-hoc network facilitated by any broadband cellular networks such as 5G.

In certain embodiments, the MP operation 426*a* whether one a cloud server (acting as the TOVI generating device 415) or on the master capture device (acting the TOVI generating device 415) receives information about the video frame resolutions from each of the capturing devices 540. Based on received information and other factors (such as quality requirement (as indicated by the content consumer via the viewing electronic device 410), real-time/live/broadcast scenario or recording with offline playback scenario, network congestion status, the number of recording devices, and the like) the MP operation 426*a* determines a suitable target frame resolution that all of the capturing devices 440 are to use during a capture session.

If the session is for offline viewing (without real-time constraints) then, the MP operation 426*a* selects the minimum of maximum-supported-video-frame resolutions from the set of minimum acceptable resolutions to maximize quality. Capturing devices 440 that do not meet the minimum acceptable resolution criterion may be excluded from the group capture session. For example, the largest resolution that is supported by all of the capturing devices 440 is selected. That is, the largest resolution of the lowest resolution device meeting the minimum acceptable resolution criterion is indicated as the resolution to be used by all of the capturing devices 440. Alternatively, to maximize the number of capture devices, the MP operation 426*a* may include devices with resolutions lower than the minimum acceptable resolution criterion but up-sample the frames from such devices to meet the selected capture resolution.

On the other hand, if the session is for low-latency, near real-time, streaming scenario under moderate to high network congestion, the MP operation 426*a* may specify that the capturing devices 440 are to capture at Full-HD (1080p) or HD (720p) resolutions or even lower resolutions to minimize latency and maximize uninterrupted, real-time streaming performance.

In addition to the diversity of video frame resolutions, the capturing devices 440 may also have a variety of supported frame rates, measured in frames-per-second (fps) available (as indicated by the metadata as shown in FIG. 6). Embodiments of the present disclosure take into consideration that allowing multiple video capture frame rates may result in greater inaccuracies and complexity of video frame-by-frame synchronization. In turn, the complexity of the TOVI application 420*a* increases to accommodate multiple frame rates. In certain embodiments, the TOVI application 420*a* obtains the multitude of frame rate information from all capturing devices 440 and determines a smallest set of target frame rates to use by the capturing devices. For example, the cardinality of the set of target frame rates is one. For instance, the TOVI application 420*a* may determine the lowest frame rate supported by all capturing devices 440 and assign the determined frame rate as the target frame rate. This set of target frame rates are sent to the capturing devices 440. The TOVI application 420*b*, which is running on each of capturing devices 440, receives the target frame rate and sets the video frame rate accordingly.

In certain embodiments, the TOVI application 420*a* whether one a cloud server (acting as the TOVI generating device 415) or on the master capture device (acting the TOVI generating device 415) determines the set of target frame rates depending on the quality requirement, type of event (sporting event or personal event, and the like), session type (near real-time streaming vs. offline viewing), and the like. For example, if the recording session is of an event requiring high-frame rate (such as a sporting event) as indicated by the user, and for offline viewing, then, the TOVI application 420*a* may determine the highest frame rate supported by all the capturing devices and assign it as the target frame rate.

The TOVI applications 420*b* running on each of the capturing devices 440 set the frame rate to the closest possible target frame rate as indicated by the TOVI application 420*a* of the TOVI generating device 415. In some instances, some of the capturing devices 440 use variable frame rates instead of a fixed frame rate during capture. In such devices (that use a variable frame rate), the TOVI application 420*b* sets the frame rate such that the average frame rate is closest to the target frame rate.

In certain embodiments, the TOVI application 420*a* identifies a target exposure time, an exposure value or EV (which is a function of exposure time, ISO sensitivity, and aperture value), and a white-balance setting based on the collective initial exposure time settings, an ISO settings, aperture settings, and the white-balance settings of each of the individual devices obtained at the beginning. In certain embodiments, the TOVI application 420*a* determines the EV for the scene based on the information obtained from all the devices. In other embodiments, the TOVI application 420*a* determines the EV by analyzing one or more video frames of the scene obtained from one or more devices along in addition to the information about the initial exposure settings if available. Based on the EV, the TOVI application 420a may determine the target exposure time (same value for all devices), the target ISO setting (per-device setting), and the target aperture value (per-device setting). In some of the capturing devices 440, such as in some smartphone cameras, the maximum frame rate (fps) is also a function of the sensor exposure time. Therefore, in these capturing devices 440, the TOVI application 420a provide an indication to set the shortest possible exposure time that meets the EV requirement. The TOVI application 420a also estimates a best possible target ISO sensitivity (per-capturing device 440) based on the EV, target exposure time, and aperture value. The EV, target exposure time, target ISO sensitivity value, and target aperture value are messaged to the corresponding capturing devices 440.

The TOVI application 420b running on each of the capturing devices 440 can set the exposure time as close to the indicated target exposure time as possible. Setting the exposure time is a stricter requirement than the target ISO sensitivity and aperture value settings. The capturing devices 440 can have either fixed apertures or multiple aperture settings. Therefore, the target ISO sensitivity and target aperture value settings in each device are weaker since they are device specific. For example, if the TOVI application 420b on any of the capturing devices 440 cannot set the target aperture value, then the TOVI application 420b sets the aperture value as close as possible (based on the device), and then sets the ISO to match the required EV.

The TOVI application 420a determines the white balance settings based on the obtained information from all devices and selects the white balance setting based on the most popular setting.

Similarly, the TOVI application 420a determines the color temperature value (such as in Kelvin) to use based on analyzing one or more images of the scene from one or more video inputs. Then, the TOVI application 420a may request all capturing devices 440 to set the white balance to color temperature and use the target color temperature value.

The TOVI application 420a can retrieves the camera and exposure settings-video frame resolution, frame rate, exposure time, ISO sensitivity, aperture value, EV, and white balance setting—from the master device (when one of the capturing devices 440 is acting as the TOVI generating device 415) and sends this information to all other capturing devices 440 which use the same settings. While this process of sharing and setting the several camera and exposure parameters is simple, it is suboptimal such as when the capturing devises are not of the same type and make.

One of the factors that directly determines the quality of multi-view reconstruction from the individual video streams captured by the capturing devices 440 is the extent (and accuracy) of frame-by-frame video synchronization achieved across the multiple video streams (captured by the different cameras). In certain embodiments a frame-by-frame synchronization during the capture is performed. In other embodiments, other techniques can be used to achieve frame-by-frame video synchronization. Some of these techniques are completely hardware-based (or hardware and firmware) solutions, while some solutions employ hybrid approaches, where part of the synchronization mechanism is implemented in hardware, and the rest in software during post processing, and finally some techniques employ completely software based solutions to achieve frame-by-frame video synchronization post capture. Traditional volumetric capture and fixed installation setups employ dedicated electronics and hardware triggers to achieve frame-by-frame synchronization across the multitude of capturing devices.

Since it is infeasible to connect the capturing devices 440 in the said setup using wires, frame-by-frame video synchronization has to be performed either wirelessly, or in software or using a hybrid approach. Even in such scenarios, where the synchronization is done over wireless network, the frame-by-frame video synchronization could be done at the time of capture, or a hybrid two-step approach wherein the complete synchronization mechanism done partly during the video capture and partly on during post-processing. In both cases of wireless synchronization, signals (messages) are passed between the capturing devices and/or the SM operation 422a over the wireless network.

In certain embodiments, wireless frame-by-frame synchronization is achieved by first synchronizing the internal clocks of the capturing devices 440. The clock synchronization is necessary to achieve a uniform clock sequence. Following the clock synchronization, all clocks of the capturing devices 440 in the network are in a common time reference frame with known time offsets between the device clocks. All decisions related to the capture and timestamps of the media (video and audio frames) are made based on the uniform clock sequence. This synchronization procedure consists of three steps. First, clock synchronization is performed. Second, a capture trigger event occurs (or is detected). Finally, frame synchronization is performed. It is noted that clock synchronization is the process of calibrating the internal clocks of each of the capturing devices 440 online to determine the clock offsets (the difference between the times of the internal clocks of the capturing devices). The main impediment for clock synchronization in wireless networks in the variable network latency.

In certain embodiments, an entity in the network such as the SM operation 422a residing on a server or CDN provides a common timing reference for all the involved devices that are capturing the videos as well as playing the videos. Protocols such as Real-time Transport Protocol (RTP)—an end-to-end, real-time streaming media transfer protocol—may be used. In some embodiments, if the Global Navigation Satellite System (GNSS)/GPS signals are visible to the terminal devices, then the GNSS signal can be used as the reference clock. In yet other embodiments, electronic phones, such as smart phones, in a common network may use the network time as the reference time. In the above three cases, the capturing devices 440 use a common reference clock. As such, the clock offsets in these examples, should be zero.

In certain embodiments, one of the capturing devices 440 (such as capturing device 440b) is selected as the master device 415a and the clock offsets of all the other capturing devices (such as capturing devices 440a, 440c-440n) are then calculated based on the clock of the master devices 415a. A trigger for capturing the event is then generated based on the clock of the master device 415a.

In certain embodiments, clock synchronization may also be achieved using the Network Time Protocol (NTP), Simple Network Time Protocol (SNTP), or the IEEE Precision Time Protocol (PTP). These protocols allow the clock offset to be calculated by sharing the time on the capturing devices 440 in network layer messages. Alternatively, the application layer can include the RTP information (such as time-stamps) to facilitate synchronization.

In certain embodiments, sidelink in an LTE or 5G network (used in D2D communications) can be utilized for synchronization among a group of capturing devices 440 that are in close proximity of one another.

Embodiments of the present disclosure take into consideration electronic devices have clock drifts. As such, device clocks are periodically synchronized to ensure the synchronization is continuously maintained across the capturing devices 440 over long periods of time during capture.

Embodiments of the present disclosure also take into consideration that it is possible that the master device 415*a* drops off the network either intentionally or due to poor network link. As such, the SM operation 422*a* can detect such situations, and act as the master or assign a different capturing device 440 as the master device to ensure uninterrupted synchronized capture.

In certain embodiments, for device-wireless network communications, the gNodeB can be replaced with other communication hubs like Wi-Fi Access Points, LTE eNodeB, 3G NodeB or 2G BTS, Bluetooth.

After the clock synchronization has been completed, the capturing devices 440 will functioning on a common clock. Once the capturing devices 440 function on a common clock the TOVI application 420*a* initiate the trigger for instructing the capturing devices 440 to capture the content of the event 430. The triggering of the capture can be done in multiple ways. In one embodiment, a naïve triggering is performed, which is a simultaneous trigger from the Base Station or the gNodeB to all the capturing devices 440. In this case, the number of capturing devices 440 is limited by the number of Resource Blocks and the carrier frequency over which the terminal devices are connected. In another embodiment, the trigger is a time-instance in the future based on the common synchronized clock (clock synchronization) of the synchronization process. This trigger initiates the capture of the media on all the capturing devices 440 based on the common future timestamp. In yet other embodiments, the trigger can come from other communication hubs like Wi-Fi Access Points, LTE eNodeB, 3G NodeB or 2G BTS.

In certain embodiments, video frame-by-frame synchronization is achieved using a hybrid approach (part of the synchronization process is done during capture and part of it is done during post processing). Firstly, before the group capture starts, the clock synchronization is performed over the wireless network using either the Network Time Protocol (NTP), or Simple Network Time Protocol (SNTP), or the IEEE Precision Time Protocol (PTP), in which the clocks of all of the capturing devices 440 are synchronized (offsets determined) with respect to the master device 415*a* (or the TOVI generating device 415), or with respect to the TOVI application 420*a* (if the TOVI application 420*a* is on a cloud server), or with respect to a common reference clock in the network. Then, either the master device 415*a* or the SM operation 422*a* in edge cloud broadcasts a message to all the subordinate devices to start capturing video. Each capturing device 440 in the collaborative capture session starts video capture after receiving the message and embeds a timestamp on to the video frames in the time-reference-coordinate of the master clock. (Each terminal device can convert the highly accurate time of exposure (usually, when the first row of the image sensor starts exposing) into a timestamp in the reference coordinate of the master clock since its time offset with respect to the master is known.) In an alternate embodiment, the converted time-of-exposure is stored in the metadata associated with the video. Following the capture, once the video (and audio) frames along with the metadata are uploaded (or streamed) to the MP operation 426*a*, which can be on the master device or on the edge cloud, the MP operation 426*a* determines the phase difference of each of the video streams with respect to one of the video streams chosen as the reference (such as the stream that started video recording last) by comparing the timestamps. Then, based on the frame rate, the MP operation 426*a* converts the phase difference to a corresponding integer number of frames. These frames are dropped from the beginning of each of the videos for obtaining frame-by-frame synchronization.

Embodiments of the present disclosure take into consideration that a disadvantage of the above method is that the above method cannot achieve perfect frame-by-frame video synchronization because while the phase differences are real numbers, the MP operation 426*a* can only drop integer number of whole-frames. Also, the largest possible synchronization error using the above technique is half the frame duration. To decrease the absolute value of the largest possible synchronization error, in an embodiment, the MP operation 426*a*, during post-processing, performs frame rate up-conversion (FRU) to virtually increase the frame rate (and decrease the frame duration) by synthesizing non-existent frames in-between the original frames. Then, for each video (except for the reference video for which the video recording started last) frames are picked starting from the frame closest to the first frame of the reference video at intervals equal to the original frame duration. The FRU-factor (roughly equal to the number of synthesized frames in-between two original frames) may be determined by the dynamics of the scene (qualitatively, how fast things move in the scene) which, the MP operation 426*a* may analyze using the rate of flow in the video frames or the average magnitude of the motion vectors (pixels) relative to the video frame width (pixels) or height (pixels), between consecutive frames in the video streams. If the scene dynamics is high (such as, greater than 0.1 or 10%), inaccuracies in the video frame-by-frame synchronization may result in unpleasant viewing experience of the immersive content. Therefore, the MP operation 426*a* may employ higher (such as 4× to 8×) FRU-factor. On the other hand, if the average magnitude of the motion vectors is of low to moderate value (such as, between 0.05 to 0.1), then, the MP operation 426*a* may employ lower (such as, 2×) FRU-factor.

Embodiments of the present disclosure take into consideration that a disadvantage of the above method is that the While the above method helps to reduce the maximum synchronization error, there is still some small residual error, and the synthesized in-between frames do not get used in the final synchronized videos. Therefore, to achieve perfect (or near perfect) frame-by-frame synchronization using the hybrid approach, the MP operation 426*a* uses the time differences to determine the exact time-instances at which to sample each of the videos (except the reference video) such that frames are synchronized. Then, the MP operation 426*a* employs video frame interpolation (VFI) to only synthesize the frames exactly at the required time instances for each of the other videos. It is noted that FRU is a kind of VFI technique. However, while FRU virtually increase the frame rate of the generated video producing (FRU-factor-1) more frames per time-unit, the video generated by VFI has the same frame rate as the original video.

Amongst the two hybrid approaches, described above, the frame-drop technique is faster, does not require any significant processing, but allows a little bit of synchronization errors. Alternatively, the VFI-based approach, which can produce perfect (or near perfect) frame-by-frame synchronization, which requires extra processing complexity to synthesize the non-existent video frames.

In certain embodiments, either of the hybrid approaches can be used by the TOVI generating device 415 depending upon the use case. For example, if the scene dynamics (measured by the average magnitudes of the motion vectors relative to the frame width or height) is low to moderate (such as, less than 0.1) such as a birthday party scenario, the MP operation 426a uses the simpler approach of dropping whole-frames from the beginning of each of the videos. Alternatively, if the scene dynamics is moderate to high (such as, greater than 0.1) such as a sporting event and the increase in latency is acceptable, then the MP operation 426a uses non-uniform VFI to achieve perfect synchronization.

Once the trigger to capture the event 430 has been initiated, the TOVI generating device 415 collects the video frames and the audio frames. The audio and video frames are collected based on a fixed periodic time based on the number of frames per second. The audio and video streams can be synchronous (the audio and video frames are collected at the same frames per second) or asynchronous (the audio and video frames are collected at independent frames per second). These frames are collected at specific intervals of time. In certain embodiments, an interval of time when the frames should be collected is identified and synchronize the stream on the terminal device to the same timestamps. For example, this can be done by resetting the capture until the frames synchronize with the specified intervals. For another example, set delays can be added in the capture sequence to align the frame captures on the terminal device with the specified master capture intervals.

To allow a new capturing device (such as a capturing device 440) to join the capture at any time, embodiments of the present disclosure enable the new capturing device to synchronize with the TOVI generating device 415, which can be an edge server or the SM operation 422a. For example, the clock of the new capturing device is synchronized with the TOVI generating device 415. Post clock synchronization, the TOVI generating device 415 can signal to the new capturing device the metadata about the collection stream which can include one or a combination of the number of frames per second, resolution of the capture, number of audio channels to capture. The new capturing device then begins collecting the data and passes it on to the TOVI generating device 415, attaching the common synchronized timestamp to each capture frame. The TOVI generating device 415 then monitors the timestamps and measures the capture time synchronization with other terminals capturing the event data on the network. Under some margin of error, the TOVI generating device 415 can signal to the new capturing device to adjust the capture to synchronize with the other terminals. In certain embodiments, the margin of error can be decided by one or a combination of the following aspects: the nature of the event being captured, the QoS requirements of the capture, the QoE requirements of the capture, the communication network capabilities, and the like. In an alternate embodiment, the TOVI generating device 415 synchronizes with each terminal at a period defined by a set time or integral multiple of frames arriving from each terminal. This is done to account for the clock drift that occurs on any of the capturing devices 440.

In certain embodiments, synchronizing the capture of the event 430 is based on an audio trigger. In this case, the trigger can be a series of acoustic pulses or golay sequences transmitted by the TOVI generating device 415, which can be an edge server or another capturing device acting as the master device 415a. The capturing can occur upon receipt of the pulse or a specified interval post the acoustic pulse. In other embodiments, the acoustic trigger can be a series of periodic chirps, where the frame is captured at the peak or crest of the chirp in the frequency domain. The acoustic triggers can be designed to lie outside the frequency range of the audio at the event being captured and removed from the multimedia capture using bandstop filters, highpass filters or notch filters.

If wireless synchronization fails (high synchronization error) or is not achievable, recorded information from the environment surrounding the event may be used. For example, the occurrence of specific sounds from the event site which are recorded by all cameras of the capturing devices 440 can be detected and used to synchronize the individual videos during post-processing.

Figure 7:
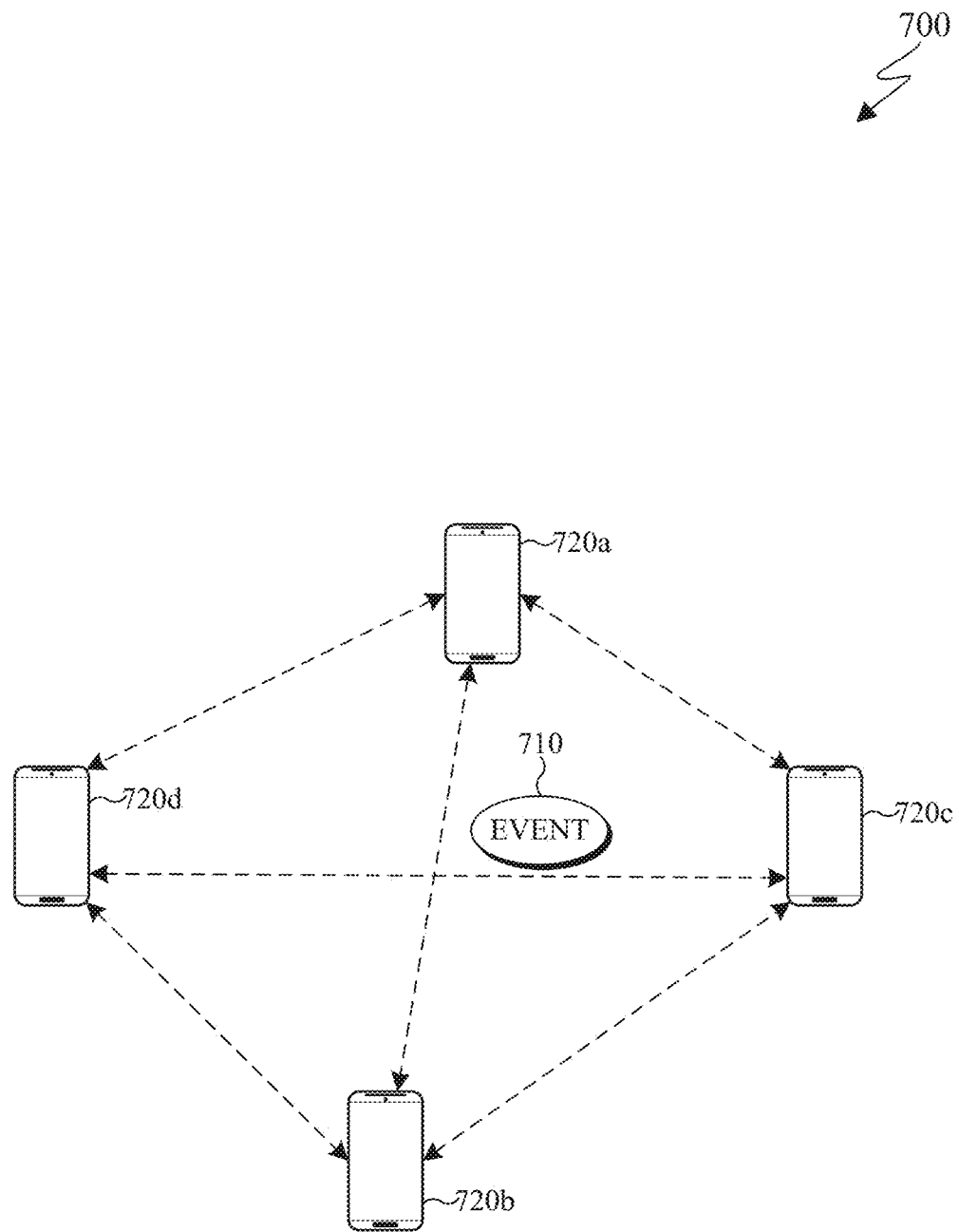
FIG. 7 illustrates an example communication environment of electronic devices that capture immersive media in accordance with an embodiment of this disclosure.

When using the capturing devices 440 to record the event 430, the location of the terminal device relative to the other terminal devices recording the event as well should be known. This information can be used to provide notify to the user of the viewing electronic device 410 where the event is being recorded from, aid the reconstruction of multi-view capture of the devices and help the TOVI application 420a understand where the captures are occurring with reference to the event. In certain embodiments the TOVI application 420a can leverage the wireless connections available on the terminal device for localization. FIG. 7, described below, localizing and synchronizing the capturing devices 440 that are located at various locations of an event.

Once the capturing devices 440 are localized relative to each other in the event space, the TOVI application 420a can use the IMU sensor (such as the sensor 365 of FIG. 3) on each device to identify the yaw, pitch and roll coordinates of the device. These coordinates indicate the direction of sight of the camera on each of the capturing devices 440. In certain embodiments, these coordinates can also be used to aid in the localization as well.

The localization and IMU sensor information can also be leveraged to incentivize one or more users associated with a capturing device 440 to identify areas from where there is no/sparse capture and record the event from there. Furthermore, the rough estimates of the location from 5G/UWB/GPS can help reduce processing time even if we do feature matching. Information about localization can be used to spatially order the images/videos before we do feature matching (only across neighboring images). Without this information, the feature matching is performed using much larger set of images.

In certain embodiments, the capturing devices 440 can be oriented either in landscape or portrait orientation (with minor tilts and rotations from the primary orientation). However, depending on the scene, it may be more suitable to use only one of the two primary orientations.

For example, if some of the capturing devices 440 use the landscape orientation and other capturing devices 440 use the portrait orientation, the MP operation 426a (either in a server or on the master device 415a) converts the frames to a common orientation increasing the complexity of the system. For instance, the MP operation 426a can fix a FOV of the TOVI video that is defined by the intersection (area-of-overlap) of the FOV in landscape and portrait orientations. Consequently, portions of the FOV in the captured frames that are outside the fixed FOV region may be lost.

For another example, to lessen the processing complexity and to maximize the preservation of the captured FOV, the MP operation 426a may recommend all the content generators to orient their phones to one of the two primary orientations during a capture session based on scene requirements or other statistics analyzed by the MP operation 426a.

For yet another example, the MP operation 426a may switch the orientation recommendations over time during the same capture session based on scene requirements or other statistics analyzed by the MP operation 426a.

For yet another example, MP operation 426a checks the sensor orientation information in the metadata (FIG. 6) during the live capture. Then, it broadcasts a message to all other users to orient their phones to one of the two orientations. For example, the recommended orientation could be the orientation used by the majority of users operating the capturing devices 440.

For yet another example, the MP operation 426a intermittently queries other devices in the capture session for their orientations using a separate message (independent of the metadata). Then, the MP operation 426a analyzes the returned messages to find out the most popular orientation of the two and recommends the most popular orientation to all users operating the capturing devices 440.

The chosen orientation can also be based on analyzing the scene and photographic composition rules instead of the most popular orientation. A deep learning network (DNN), trained on images and associated ratings for composition, can be used to find the best orientation to employ for the scene. The DNN may be on every capturing device or on the MP operation 426a. The DNN analyzes the scene for the best orientation from the multiple viewpoints and estimates a best orientation for the scene. The best orientation information is then broadcast to all of the capturing devices 440.

Figure 12:
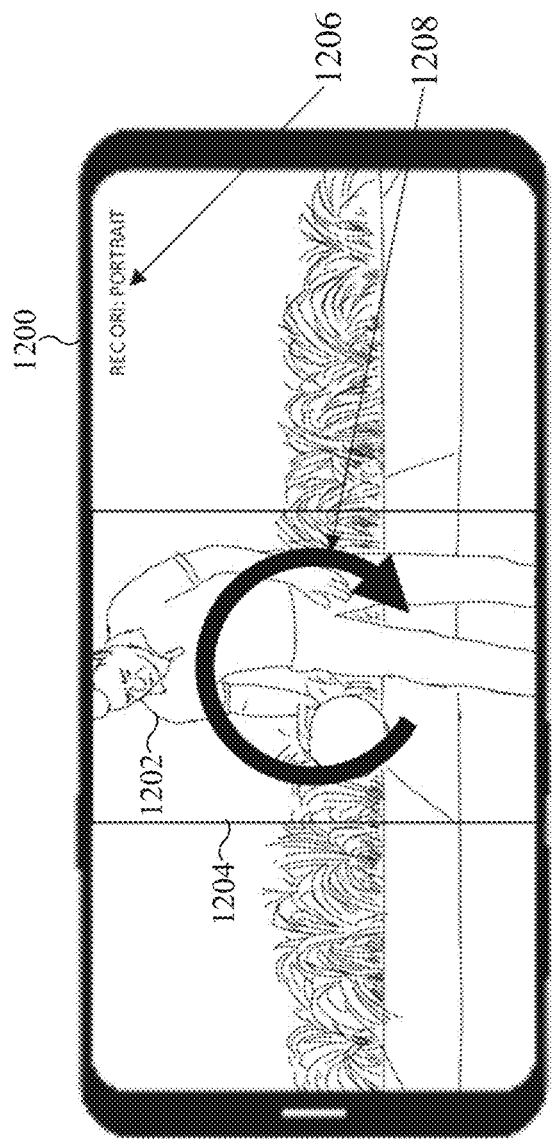
FIG. 12 illustrates an example UI recommending a change in orientation of an electronic device while capturing media in accordance with an embodiment of this disclosure.

The recommended orientation can be specified on the display during the recording session as shown in FIG. 12. In addition, an arrow may be overlaid on the live-preview in those devices in which a change of orientation is required as shown in FIG. 12.

The MP operation 426a also reconstructs the immersive content (either in real-time or offline, depending on the mode of operation) from the individual audio and video streams received from the terminal devices recording the event. Depending on the determined QoS/QoE (which also encodes information about the configuration and capability of the terminal devices) the MP operation 426a reconstructs the immersive contents to deliver either a multi-perspective image, a multi-view video, a 360° video, or volumetric video. the various reconstructed content allow for free-view point viewing.

The video frames from the disparate devices can be color-matched by the MP operation 426a before the reconstruction. Furthermore, in order to accommodate the lighting variations from different directions as the view angle changes inter-frame color matching is performed locally. That is, the color-matching is performed between the frames of neighboring cameras. Alternatively, if the total viewing FOV is not too large, MP operation 426a may perform a single global color-matching. In either case, one camera from a group of neighboring cameras is selected as the reference camera, and then the colors from patches that are visible to all the cameras in the group are used for the comparison. Common metrics such as Delta E (dE), represents the "distance" between two colors can be used. If the average dE between two neighboring frames is less than the just-noticeable-difference (JND), the color-matching can be bypassed. Otherwise, a color correction matrix may be computed and applied to the frames (other than the reference frame) to match the colors.

The MP operation 426a also generates and streams immersive contents based on the viewpoint requested by the content consumer of the viewing electronic device 410. In order to provide a seamless viewpoint change experience to the user, the MP operation 426a predicts, based on past inputs from the user of viewing electronic devices 410 and accordingly generates view-dependent content.

The size of the data streamed from each of the content-capture terminal devices to the MP operation 426a before reconstruction, and from the MP operation 426a to the content consumers' terminal devices following reconstruction is typically large. Therefore, the streams of data from the capturing devices 440 to the TOVI generating device 415 is encoded and compressed using standard video, audio, and metadata compression techniques used for real-time streaming. The immersive content sent from the MP operation 426a to the viewing electric device 10 is also encoded and compressed using standard immersive media compression techniques such as MPEG MIV, MPEG Surround, and the like.

The MP operation 426a may make streams from the fixed cameras and drones separate from smartphone streams and make them available in the application as distinct view or may combine all streams in a suitable manner.

The MP operation 426a may use the field-of-view and relative positions of devices to select one stream as a representative for a given range of angles (the area corresponding to the angle from 0 degrees to 30 degrees may be represented by an angle of 15 degrees when a circle with the center in the middle of the stadium is considered). The MP operation 426a may combine steams using suitable AI-based or non-AI-based techniques (such as Gaussian filtering of pixels).

To improve the quality of the reconstructed TOVI video and lower the complexity of processing, the capturing devices 440 may be mounted on some suitable supports (tripods) at fixed locations surrounding the event or around the main subject in the event (such as focusing on a child eating cake on their birthday). Furthermore, to aid post-capture alignment, a simple pre-capture calibration step may be performed by placing a vertical thin pole at the location of the main subject, marking two or more identifiable positions along the pole that is visible to all the capturing devices from all the angles, and taking a short video. A variety of items, such as thin color strips or fiducial markers such as ArUco or AprilTags, may be employed for automatic detection. In certain embodiments, two or more marked points are used. When such calibration videos are available, the MP operation 426a can detect these markers to determine the difference in scale, rotation and spatial alignment in the field-of-view (FOV) of capturing devices, estimate the geometrical transformation needed to compensate for these differences to align the viewpoints, and apply the transformation to generate a free viewpoint video centered at the location of the pole in the scene. The pole, which is used during the calibration step, can be removed during the capture of the event 430.

Such pre-capture calibration procedure can also be done for pre-planned collaborative capture of sporting events in local clubs, courts, and stadiums such and the like. Then, the capturing devices 440 can be mounted on suitable supports at fixed locations. A simple calibration video may be captured as described above, and the calibration video may be uploaded to the MP operation 426a. The MP operation 426a uses the calibration videos to pre-compute the geometric transformations required needed for aligning the individual video frames of the actual event and generating the TOVI video. The pre-event calibration videos can also be used to perform color-correction and color matching to correct for the non-uniform color response of the disparate capturing devices.

In certain embodiments, users of the capturing devices 440 do not perform any calibration steps. Furthermore, users can handhold their capturing device 440 and are free to move while capturing. As such, the MP operation 426a can reconstruct the TOVI videos without any calibration. Towards that end, the following description is used may be used to generate a free viewpoint TOVI video without any calibration. The end-goal is to identify at least two points that have the same depth and visible in all cameras such that these points may be used as pivot points. Ideally, we desire these pivot points to be located on the centerline in the FOV of each of the capturing devices 440. The method 800 of FIGS. 8A and 8B describes a simplified steps for reconstructing a TOVI video by using a fixed time instance.

In certain embodiments, the TOVI application 420a provides the ability to identify a main subject in the master device's FOV, continually locate the same subject in all the subordinate devices' FOV during the collaborative capture session and provide on-screen visual guides and indicators to help the users to continually orient and position their capture devices such that the main subject remains near the center of the FOV in each device.

During the processing stage, the MP operation 426a estimates the accurate pose of the devices and geometric structure of the scene from the input views. Embodiments of the present disclosure take into consideration that inaccuracies in the video frame-by-frame synchronization in the presence of dynamic objects in the scene can be detrimental to the estimation of pose and geometric structure. Therefore, in certain embodiments, the MP operation 426a masks out the regions in the frames containing dynamic objects before feature detection. If the target use case is a low-latency, near real-time streaming application, the MP operation 426a uses fast object detection to bound the bounding boxes and takes a union of the bounding boxes to create a mask. Alternatively, if the target use case is an offline viewing application or if the use case can afford higher latencies, the MP operation 426a estimates optical flow or instance segmentation to locate and mask out the regions containing the dynamic objects more precisely.

In certain embodiments, depending on the relative size of the main subject in the FOV, the MP operation 426a extracts the initial pivot points in all views from the main subject using either a combination of coordinates of the bounding boxes of the whole body and face of the main subject or using the coordinates of the two antipodal points retrieved after projecting the midsternal line, obtained via pose landmark detection, of the main subject on the vertical axis. Furthermore, the initial pivot points can be filtered while taking the scene scale into account.

In the following description of reconstructing the TOVI video it is assumed that all the videos from the different views have the same frame dimension. If the original frame dimensions vary, then the TOVI application 520a resizes the video frames to a common frame dimension. The following description includes eight (8) separate steps. The first step determines the main subject in the FOV of the camera of the master device 415a. As discussed above, the master device 415a is one of the capturing devices 440 that acts as the TOVI generating device 415. In the second step the master device 415a performs a sparse reconstruction. In the third step the master device 415a determines the location of the main subject in the other FOV of the other cameras of the capturing devices 440. In the fourth step the master device 415a provides on screen visual guides during the live capture. In the fifth step the master device 415a determines accurate camera pose and scene structure. In the sixth step the master device 415a determines the initial pivot points about which the views will be aligned. In the seventh step the master device 415a refines the pivot points. In the eighth step the master device 415a estimates the geometric transformation and generates the free viewpoint video.

The first step determines the main subject in the FOV of the camera of the master device 415a. The TOVI application 420a of the master device 415a identifies the main subject in the scene around which the views in the free viewpoint video shall be rotated. To do so, the TOVI application 420a provides two pre-selectable modes, (i) automatic and (ii) user selected that sets how the main subject is to be identified in all cameras (or individual videos from each camera) used during a collaborative capture session. In certain embodiments, once the mode is selected by the user of the master device 415a, the selected mode is broadcasted to other devices in the network.

When the automatic mode is selected by the user of the master device 415a, a process is used to determine the main subject that is at least present in the master camera's FOV. For this purpose, an object detection algorithm (such as YOLOv4 or Mobilenet SSD, and the like) is first used to identify the various objects that are present in the scene. Then, each detected object is assigned an aggregate score based on the class of object (for example a person is given a greater class-score, than a pet, which is given a greater class-score than a chair, and the like), object occupancy (i.e., un-occluded size) relative to the frame size (objects with greater occupancy is given more weight), and the location of the object in the FOV (objects towards the center are assigned greater score than objects towards the periphery of the FOV).

When the User selected mode is selected by the user of the master device 415a, a fast instance segmentation of objects in the FOV of master camera is performed which presents user-selectable regions with highlights to distinguish the regions to the master camera's operator. Speed rather than accuracy is more desirable for this operation. Depending upon the type of interface provided by the device, the master camera's operator selects one of the segmented objects as the main subject. For example, on a touch sensitive display, the user may tap on the segmented regions with her finger to assign a subject.

Information about the selected subject in the master device 415a is then broadcasted to other capturing devices 440 in the group so that the subject is identified in all of the capturing devices. The transmitted information could be one of the location of the centroid of the subject region, the set of points to describe the convex hull of the subject region, a set of dominant image features, the name of the object if the object is identifiable by the same name in all capturing devices in the group. In addition, in some embodiments, the master device 415a broadcasts an image of the scene (from its viewpoint) with the main subject highlighted to the subordinate devices in the group so that operators of the subordinate capturing devices 440 can roughly orient their devices towards the main subject using the image as an initial guide.

In step two the master device 415a performs a sparse reconstruction. Once the individual capturing devices 440 start a synchronized capture session, a rough-but-fast sparse reconstruction is carried out by the MP operation 426a which is either implemented in a server close to network edge or on the master device 415a. The sparse reconstruction can be used to transform the coordinates and other such geometric information of the main subject in the frame of the master device 415a to the other devices' frame. Note that the sparse scene reconstruction is not performed for every frame as time progresses even if the main subject moves and the camera orientations change to in response to the subject movement. Once the main subject is detected and located in the master camera and in the subordinate cameras (as described in step three, below), an object tracking algorithm (such as DeepSORT, and the like) is used to track the objects in subsequent (future) frames. Sparse scene reconstruction may be reinitiated if a certain number of cameras lose track of the main subject for certain interval of time.

In step three the master device 415a determines the location of the main subject in the other FOV of the other cameras of the capturing devices 440. Here, each of the subordinate capturing devices 440 in the group performs a fast instance segmentation of the scene and selects the region (or instance) that overlaps with the main subjects' geometric location following the transformation of the main subject's location from the master camera's frame to the subordinate camera's frame.

In step four the master device 415a provides on screen visual guides during the live capture. The main subject is continually tracked in each device independently. To help the users orient their capturing devices such that the main subject is maintained near the center of the FOV, and to help the object tracking algorithm maintain tracking during the capture session, a visual guide (such as shown in FIG. 9) can be overlaid on the live-preview display during the capture. Various visual guides can be used. For example, a visual guide could simply be a rectangle at the center of the display whose width and height is determined by the width and height of the main subject's bounding box. In addition to the rectangular box, the TOVI application 420b may display arrows and textual recommendations on screen in response to the main subject's movements relative to the center of the FOV of the camera. The relative movements are a result of both subject motion, drifting movement of the camera away from the subject either due to translation or tilts, and rotation of the devices In step five the master device 415a determines accurate camera pose and scene structure. An accurate determination of relative camera pose, and scene structure is used for two reasons. First, the relative camera pose information may be used to correct for the variance in position of the estimated key points (in step six, below) arising from the difference in the pose between the cameras. Second, the reconstructed scene geometry may be used to improve the quality of reconstruction of all TOVI video including free-viewpoint video, wide-FOV photomontages, and the like and even for the reconstruction of 6DoF volumetric videos. The degree of denseness of the reconstructed scene geometry may be driven by the desired quality, type of TOVI video, and desired degree of immersive experience.

The first step in the 3D reconstruction process is feature detection and matching across the different views which governs the overall quality of the reconstructed content. Small synchronization errors during the capture of dynamic scenes can be detrimental for the feature matching process resulting in the loss of quality of feature detection and matching. Therefore, it is beneficial to remove or mask out the dynamic objects in the frames before image feature detection and matching.

There are a number of ways to create such masks: For example, for each view, the flow-field (or optical flow) is estimated from prior frames (such as by using FlowNet2, and the like) to estimate dynamic regions within the frame, following by application of a threshold to the flow-field. For another example, for each view, the TOVI application 420a performs instance segmentation (such as by using Mask R-CNN, and the like) to identify and localize the presence of objects in the scene that are typically dynamic such as people, animals, sports balls, sport bats, and the like. Then, a union of identified regions corresponding to the dynamic objects is used to generate a mask. For yet a third example, for each view, the TOVI application 420a may perform object detection (for example using YOLOv4) to identify and localize the presence of dynamic objects (such as humans, animals, sports balls, and the like) in the scene. Then, a union of the bounding boxes corresponding to the dynamic objects is used to generate a mask.

While the flow-field and instance segmentation based techniques are better from the point of view of retaining more image features for detection and matching within the FOV, they are more complex and takes longer time to process than object detection based technique. Therefore, in certain embodiments, the MP operation 426a may use either the optical flow/instance segmentation based techniques or object detection (and taking a union of the bounding boxes) to create the masks based upon whether the use case is targeting low-latency and near real-time streaming application or offline viewing respectively.

For dynamic scenes, the masks (for every view) are generated for every frame. In cases where the background can be approximated as a plane, simple homographies can be estimated and used for compensating the variances in the location of key points (in step six, below) instead of a dense reconstruction.

When available, the data from the IMU sensors (such as the sensor 365 of FIG. 3), UE location information in the metadata, or UWB location estimation can be used along with image features to improve the reconstruction.

In step six the master device 415a determines the initial pivot points about which the views from the capturing devices 440 will be aligned. As described above, if a pre-capture calibration video is available, the MP operation 426a can automatically detect the marked points on the pole and use them to find the geometric transformation that will compensate for the variances in scale, rotation, and spatial alignment. Since the views in the final free viewpoint video appears to rotate about these marked points (not visible in the final content video), we call them as "pivot points." In the absence of calibration videos, the MP operation 426a automatically determine these pivot points. The pivot points about which the views in an outside-in free viewpoint video rotates may be obtained in a number of ways.

For example, the pivot points may be derived from the coordinates of the bounding box belonging to the main subject in each view (individual video). Specifically, the coordinates of the center points of the top and bottom sides of the main subject's bounding box may be designated as the initial pivot points. Note that, despite the presence of visual guides (step four), the capturing devices will inevitability have some degree of rotation which results in a rotation of the frame away from the standard portrait or landscape orientation. In certain embodiments, the rotations of the frames are first corrected by applying appropriate rotation transformation derived either from the IMU sensors or from the camera poses (step five).

Figure 10B:
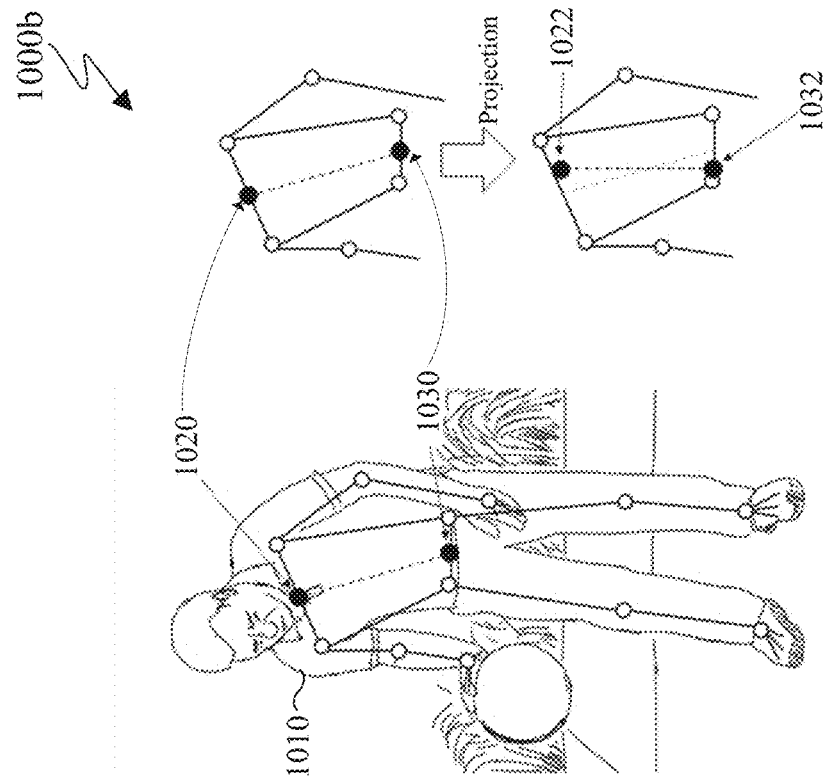
FIG. 10B illustrates pose landmarks and antipodal points in accordance with an embodiment of this disclosure.
Figure 10A:
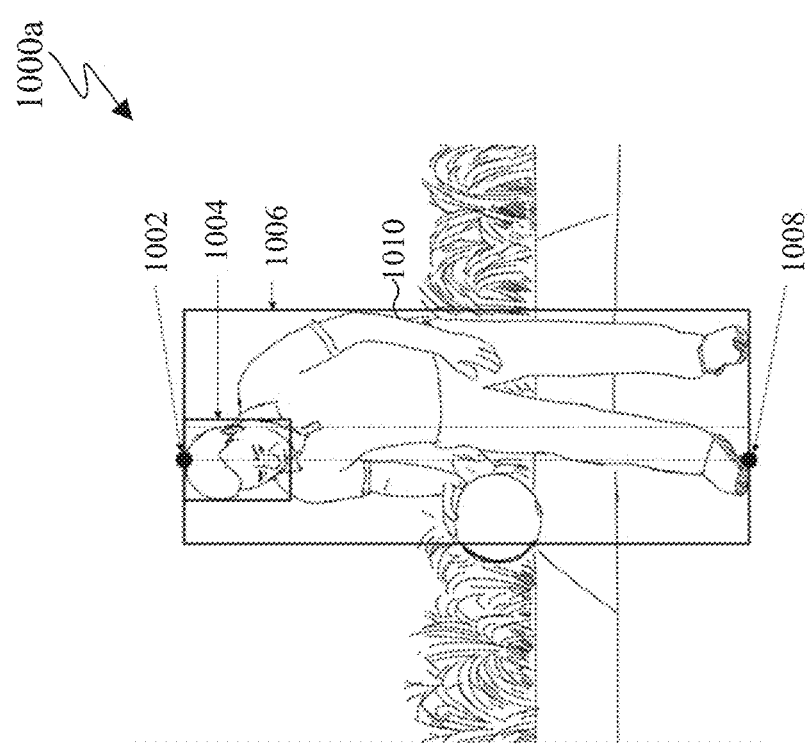
FIG. 10A illustrates initial pivot points of an object in accordance with an embodiment of this disclosure.

In certain embodiments, a line connecting the top and bottom center coordinates of the bounding box passes through the center of the main subject. However, in practice, the main subject may not always be centered within the bounding box. For example, if the main subject is a human who has his arms stretched out towards one side of his body. Then, the center line of the bounding box will not pass through the center of his body from some views. To rectify this issue, in an embodiment, the TOVI application 420*a* also performs face detection or facial feature detection of the main subject's face. Then, the TOVI application 420*a* combines the geometric information from the whole-body bounding box and the face bounding box (or other facial features) to center the pivot points along or close to the midsternal line of the main subject. In certain embodiments, the TOVI application 420*a* (i) assigns the horizontal coordinates from the middle of the facial bounding box or facial features near the center of the face to the horizontal coordinates of the (initial) pivot points, and (ii) assign the vertical coordinates of the top and bottom sides of the whole-body bounding box to the vertical coordinates of the (initial) pivot points as shown in FIG. 10A.

In other embodiments of, the MP operation 426*a* uses instance segmentation (such as by using Mask R-CNN, and the like) and identifies the regions (pixels) associated with main subject based on the location of the main subject obtained from the continual object tracking process. When the frames have been corrected for rotations (deviations from the portrait or landscape orientations) as discussed earlier, the TOVI application 420*a* identifies the vertical line passing through the center of the blob of pixels belonging to the main subject. Then, at least two points from the line from that with the top and bottom boundaries of the segmented region of the main subject are selected as the initial pivot points.

In certain embodiments, the MP operation 426*a* estimates the pose and retrieve pose landmarks (for example, using OpenPose, MediaPipe Pose, Detectron2 key point detection, or XNect and the like) belonging to the main subject. One or more of these landmarks may form the basis for the pivot points. For example, the MP operation 426*a* may derive the pivot points from (i) the center of the left and right shoulder landmarks (mid-shoulder point) and (ii) the center of the left and right hip landmarks (mid-hip point). These two points, however, may not be used directly as pivot points since the line joining these points may not be aligned with the vertical axis. Furthermore, the line joining these points may have different tilts (with respect to the vertical axis) in the different views. Aligning the frames (from different viewpoints) using these points directly, could result in undesirable rotations of the frames. Therefore, the initial pivot points are obtained by first projecting the line joining the mid-shoulder point and the mid-hip point to the vertical axis and selecting the two antipodal points from the projected line as shown in FIG. 10B.

In other embodiments, the pose landmark estimation and object detection may leverage the multiple views available from the frame-by-frame synchronized video captures and estimate the said parameters in 3D instead of independently computing the parameters in each video. Using multiple views for estimating these parameters leads to estimates that are consistent across multiple views and more robust solutions.

The selected pivot points should have the same relative depth, or at least, the difference in depth values for the pivot points should be small (less than a threshold). If not, the pivot points will have different disparity (proportional to the depth) across the different views as a consequence of motion parallax. This differences in disparities of the pivot points may induce undesirable rotations to the frames (belonging to the different views from different cameras) during alignment (step eight below). Therefore, in certain embodiments, the relative depth-map is obtained, and a depth constraint is applied while selecting the pivot points such that difference in the depth values of the select pivot points are within a small threshold. The relative depth-map may be obtained in a number of ways. For example, the depth-maps can be estimated from step five or estimated separately using stereo depth estimation and depth densification. For another example, the depth-maps may be provided by the capturing device if the devices have built-in depth sensor or provides a depth API such as the ARCore Depth API for ANDROID devices or the ARKit Depth API for iOS devices.

In certain embodiments, both bounding box detection and pose landmark estimation are be used by the MP operation 426*a* depending upon the scale of the main subject relative to the total FOV. For example, if the relative size of the main subject is small, then the estimated landmark coordinates obtained from the pose may be noisy and fluctuate across the different views. In such scenarios, the MP operation 426*a* uses the pivot points obtained from the bounding box coordinates.

In certain embodiments, a view synthesis is used to generate smooth view transitions. For example, the views can be synthesized prior to the determination of initial pivot points. Following the generation of the view videos, the initial pivot points are determined on the views similar to the videos from the real cameras. In an alternative embodiment, since the relative camera poses and scene structure are known (step five, above), the pivot points obtained from neighboring views may re-projected to the virtual camera's image plane to obtain the pivot points in the novel views. However, the fidelity of the pivot points in the synthesized views may be greatly improved if this process is applied on the refined pivot points (step seven, below) belonging to the frames obtained from the real cameras.

In step seven the master device 415*a* refines the pivot points. The initial pivot points of step six can be refined since, the points could include some degree of noise (variability in position along the vertical direction). The noise can result from inaccuracies in the estimation of exact and tight bounding boxes, instance segmentation, and pose landmarks. The noise can also be caused due to variances in the estimated bounding box parameters, instance segmentation region area, and pose landmark positions across the different views. Additionally, the noise can occur when the object detection algorithm, instance segmentation algorithm, the pose-estimation algorithm, or any combination thereof fail to detect and return the corresponding parameters for some frames. It is noted that the above variances manifest not only across the different views at a fixed instance of time but also over time. Therefore, filtering needs to be done both across views and over time.

Filtering can be performed for scenarios in which the videos are processed for near real-time streaming or offline (after the content-generators finishes the synchronized capture and uploads the videos to the central processor for processing, which could be one of a centralized server, MEC, or even on the master device). In case of near real-time streaming, sufficient frames from each video are buffered such that both past and future frames are available during the processing of the current frame.

In certain embodiments, filtering is first applied temporally to the initial pivot points independently for each view (video from each of the independent cameras). First, the frames with missing pivot points (frames where detection/segmentation/landmark estimation failed) are identified and filled in by the average of the corresponding landmark coordinates in the frames immediately preceding and immediately lagging the frames with missing pivot points. Then, temporal smoothing filters are applied to the initial pivot points for each view (video from each of the independent cameras). Finally, the TOVI application 420a accounts for variances (fluctuations) in the vertical positions of the pivot points across the different views which could arise due to pose-estimation errors or due to the changes in the camera parameters (mainly variances in the focal lengths, digital zoom factors, and camera motions such as the distance from camera to the main subject). Variances in the pivot points' positions arising due to the underlying changes in the camera parameters is preserved in order to so the estimation of the geometric transformation (in step eight) would be correct.

In certain embodiments, the pivot points (which are horizontal and vertical locations in pixel coordinates) are first scaled according to the scale factor determined from projective transformations between the different views (step 5), followed by the application of a weighted moving average (WMA) filter applied along the view dimension (at a fixed time), followed by inversing the scale. The WMA filter puts more weight on the values of the pivot positions in the current frame (current time) than on the previous and following frames.

In certain embodiments, a filtering technique that minimizes the error between the predicted height of the pivot points from the actual height, with a regularization term that is a function of the absolute difference in the height (vertical coordinates) of the two antipodal pivot points in the current view from the previous view is used to refine the initial pivot points.

In certain embodiments, pivot points from multiple modalities (object detection and bounding boxes around the main subject, instance segmentation of the main subject, pose landmark estimation, and the like) are combined to produce a more robust estimate of the pivot points.

In step eight the master device 415a estimates the geometric transformation and generates the free viewpoint video. The refined pivot points (of step seven) are used to estimate the similarity transformations (accounts for scaling, rotation, and spatial alignment) that are used to align the views and create a free viewpoint video without any calibration.

In certain embodiments, one of the capturing devices is assigned as the reference device/view. The refined pivot points belonging to the reference view are designated as the reference points, and the pivot points from every other view as the source points. Then, the each of the source and reference points are used to estimate the similarity transformation between each of the corresponding views and the reference view. The frames are then aligned by applying a similarity transformation.

In certain embodiments, steps one, two, and three, (described above) can be omitted when all of the capturing devices 440 decide on the main subject prior to the capture and agree to orient their individual capturing devices during the capture such that the main subject is within rectangular guide described in step four.

In certain embodiments, to reconstruct the TOVI video with smooth transition between views, the MP operation 426a synthesizes novel virtual views (view interpolation) between the captured views. Although virtual view synthesis is not required in every situation, it becomes useful to employ view synthesis when the density of capturing devices at an event is not sufficient to capture and produce smooth view transitions using only the real viewpoints. In such cases, either via automatic detection or via user input, the MP operation 426a employs virtual view synthesis to generate a number of virtual views in-between the real views. Furthermore, instead of synthesizing videos of novel viewpoints between every real views, the MP operation 426a may generate novel views in-between a selected set of (sparse) views. This selection, as before, may be either via automatic detection or via user input. For example, in the scenario of automatic detection and generation of novel views, the MP operation 426a determines the number, locations, orientations and field of views (FOVs) of the capturing devices from the metadata (of FIG. 6) or pose estimation (as steps two and five). The MP operation 426a may then determine the local density of devices and the local FOV overlaps based on which it may generate novel views.

The MP operation 426a can also determine the dominant type of arrangement in the locality of a group of capture devices. If the dominant arrangement of cameras in the locality is linear or planar (FIG. 11A) and the FOV overlap between neighboring views is less than a threshold percentage (such as less than 65%), then the MP operation 426a performs view synthesis between the views. If the dominant arrangement of the cameras in the locality is circular (FIG. 11B), then the MP operation 426a determines the need for view synthesis based on the inter-view angle (FIG. 11B), which is the dominant factor, and the FOV overlap. For example, if the inter-view angle is greater than 30 degrees or the FOV overlap is less than 85%, then the MP operation 426a performs view synthesis between the views.

In certain embodiments, the user may preempt the MP operation 426a from synthesizing novel views via user settings. Furthermore, in certain embodiments, the MP operation 426a uses a hybrid representation of the world and format for the immersive content, employing both 2D images and geometry (like meshes and point clouds). In order to reconstruct the geometry, the MP operation 426a may employ classical unstructured multi-view geometry techniques from computer vision such as including feature point detection, matching, sparse reconstruction using structure from motion (SfM), and finally dense reconstruction (as described in steps one through five). Furthermore, the MP operation 426a can also convert the reconstructed point clouds into meshes for rendering smooth geometry.

The MP operation 426a can also employ a fast AI-based algorithms to do the reconstruction in near real-time. Furthermore, such techniques may completely bypass classical techniques for both view synthesis and multi-view geometry reconstruction such as SM. Often, these techniques may use some geometry information such as depth maps to aid the reconstruction.

In certain embodiments, the TOVI videos contain views from multiple angles and surround sound or immersive audio at each instance of time throughout the length of the TOVI video. Certain content consumers can edit the TOVI videos to create a regular 2D video with a story line that follows certain specific views over time. Additionally, content consumers can also edit the sound timeline and add new sounds and music. Furthermore, content consumers can also add (overlay) 2D and 3D visual objects on the videos. These edited contents may also be shared with other content consumers using the app.

Figure 5:
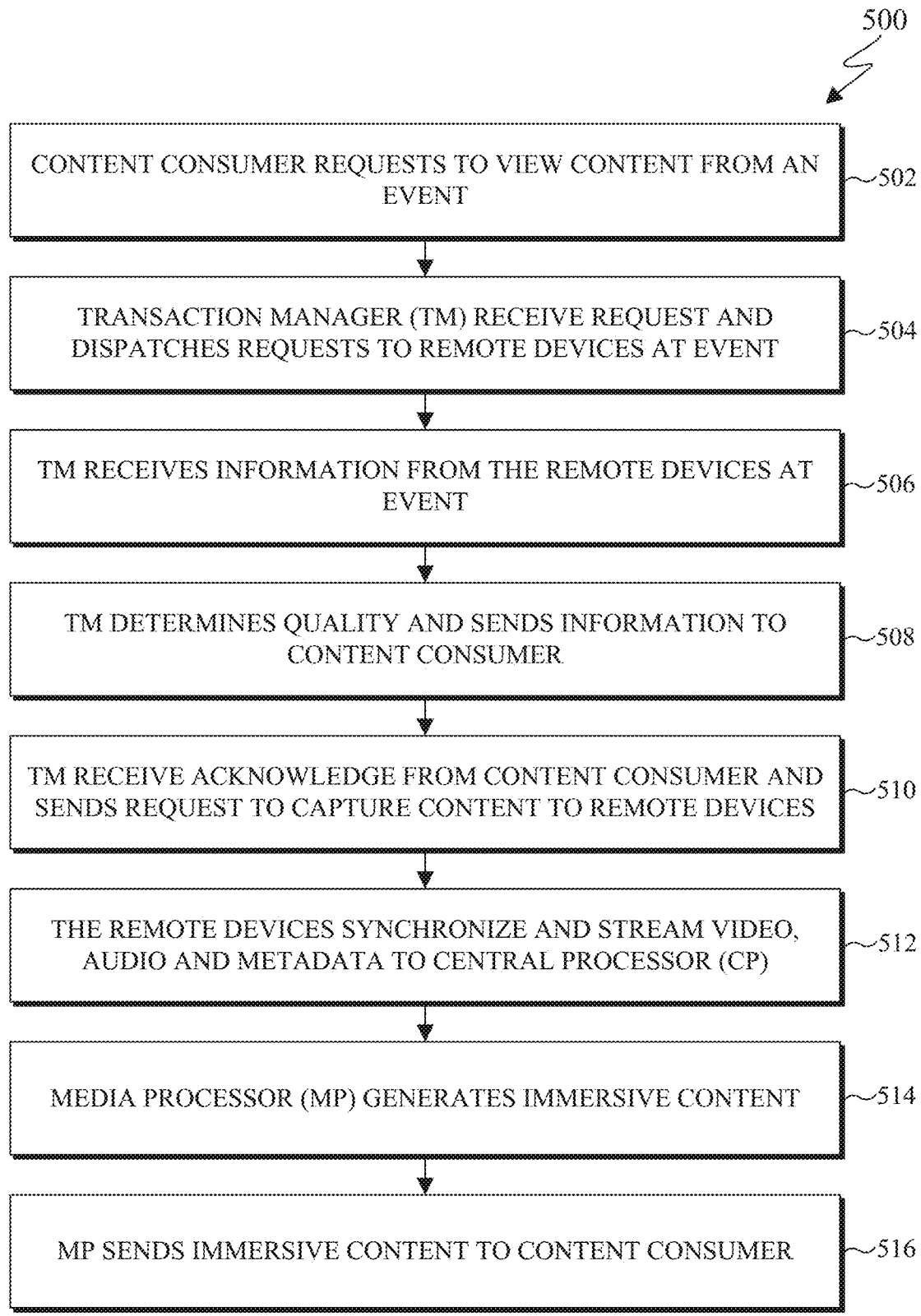
FIG. 5 illustrates a method for streaming immersive content based on a request in accordance with an embodiment of this disclosure.

FIG. 5 illustrates a method 500 for streaming immersive content based on a request in accordance with an embodiment of this disclosure. The method 500 is described as implemented by any one of the client device 106-116 of FIG. 1 or the server 104 of FIG. 1 and can include internal components similar to that of server 200 of FIG. 2 and the electronic device 300 of FIG. 3. However, the method 500 as shown in FIG. 5 could be used with any other suitable electronic device and in any suitable system.

In step 502, the TM operation 424a of the TOVI generating device 415 receives, from a viewing electronic device 410 a request to view immersive content of an event, such as the event 430. The request can be sent using the TOVI application 420c.

In step 504 the TM operation 424a, of the TOVI generating device 415, receives the request from the viewing electronic device 410. Upon receipt of the request, the TM operation 424a sends a request to potential capturing devices at the event 430. In certain embodiments the TM operation 424a identifies the potential capturing devices at the event 430 based on location information that is received from the potential capturing devices. Upon identifying one or more potential capturing devices, the TM operation 424a sends a request to capture the event 430. In certain embodiments, the TM operation 424a authenticates the viewing electronic device 410 before sending the sending the request to the potential capturing devices at the event 430

In step 506, the TM operation 424a receives information about the potential capturing devices at the event 430. The TM operation 424a can also handle authentication, monetary information, and rewards for the potential capturing devices. In step 508, the TM operation 424a determines a QoS/QoE from the information received from the potential capturing devices. The TM operation 424a can then send the determined QoS/QoE to the viewing electronic device 410, allowing the content consumer for acceptance.

After In step 510, the TM operation 424a receives an acceptance message from the viewing electronic device 410. Upon receiving the acceptance message, the TM operation 424a sends a request to the potential capturing devices to start capturing content and send the data to the TOVI application 420a. In certain embodiments, the capturing devices 440 located around the event 430 that receive the request to capture content create a wireless network and synchronize.

In step 512, the capturing devices 440 synchronize and start capturing and streaming video, audio, and metadata to the TOVI application 420a of the TOVI generating device 415. In step 514, the MP operation 426a of the TOVI application 420a generates the immersive content based on the received streams and metadata from the capturing devices 440. The immersive content, generated by the MP operation 426a, can include multi-view video, spatial audio, and the like. In certain embodiments, the MP operation 426a generates the immersive content based on a requested viewing location from the content consumer via the viewing electronic device 410.

In step 516, the MP operation 426a encodes and compresses the immersive content. The MP operation 426a can also stream the compressed content with metadata to the viewing electronic device 410 of the content consumer.

Although FIG. 5 illustrates one example of a method 500 for streaming immersive content, various changes may be made to FIG. 5. For example, while shown as a series of steps, various steps in FIG. 5 could overlap, occur in parallel, or occur any number of times.

FIG. 6 illustrates an example table 600 that includes metadata elements in accordance with an embodiment of this disclosure. The example table 600 as shown in FIG. 6 illustrates one specific example of an of various types of metadata elements that can be transmitted from one of the capturing devices 440 to the TOVI generating device 415. However, any number of metadata elements and any type of metadata element can be included in the table 600.

The table 600 includes a user ID. The user ID identifies the user of the capturing device as well as the particular user who is using capturing device to capturing content of the event 430. The metadata can also include location information of the capturing device. For example, the location of the capturing device 440 can be determined by the capturing device 440 itself, the network (such as by using the measurements of the serving cell and/or neighboring cells reported by the UE), and both. For instance, device location information may be retrieved from GNSS/GPS sensors, if available, in the capturing device 440. Additionally. information derived from the wireless network can aid in localization and synchronization of the capturing device 440 can be included in the metadata (such as by an application layer timestamp that can be specified in RTP and physical layer quantities such as Hyper Frame Number, System Frame Number, Subframe Number, and Slot Number). Location (relative to a chosen reference, such as the master capture device) information may also be determined using computer vision techniques such as Structure from Motion (SfM) followed by Multi-View Stereo (MVS). It is noted that the accuracy of localization and synchronization directly affects the quality of the reconstruction.

The metadata, as shown in the table 600 can also include information about the sensor (or capturing device) such as sensor resolution, sensor orientation, device pose (location and device orientation), video frames per second (fps), and the like. The device orientation information may be retrieved from the inertial measurement unit (IMU) in the terminal device. The metadata can also specify a current aperture value and/or another aperture values the camera on the capturing device can use. Similarly, the metadata can specify the current exposure time (shutter speed) and/or other exposure times the camera on the capturing device can use. The metadata can also specify a current color temperature as well as other temperatures the camera on the capturing device can use in capturing the event 430. The metadata can further specify the orientation of the camera of the capturing device, (such as whether the camera of a capturing device 440 is capturing the event 430 in a landscape mode or a portrait mode).

Additionally, the metadata, as shown in the table 600 can include information about the event itself. For example, the metadata can specify the name or location (address, geographic location, and the like) of the event. The metadata can specify a type of event such as a concert, sporting event, a personal event such as a birthday party, and the like. The metadata can further indicate the main object r subject that is being captured.

FIG. 7 illustrates an example communication environment 700 of electronic devices that capture immersive media in accordance with an embodiment of this disclosure. The electronic devices of FIG. 7 could be similar to any of the client devices 106-116 of FIG. 1, any of the capturing devices 440a-440n of FIGS. 4A, 4B, 4C, and 4D, and can include internal components similar to that of the electronic device 300 of FIG. 3. The example communication environment 700 as shown in FIG. 7 illustrates one specific example of an of a communication environment.

The communication environment 700 includes four capturing devices 720a, 720b, 720c and 720d capturing an event 710 from different locations. The capturing devices 720a, 720b, 720c and 720d can be similar to any of the capturing devices 440a through 440n of FIGS. 4A-4D. The communication environment 700 describes using UWB, 5G, D2D communication systems for localization and synchronization of the capturing devices 720a, 720b, 720c and 720d.

As shown in FIG. 7, localization information can be obtained from a Base Station or a gNodeB for the capturing devices 720*a*, 720*b*, 720*c* and 720*d*. This can be done by using the beam information from the antenna to identify where a capturing device is located in space in terms of azimuth and elevation relative to the base station or gNodeB. The location of any of the capturing devices can be obtained performing trilateration using three nearby base stations. In the event, there are less than three base stations, a cooperative positioning can be performed using D2D links between the capturing devices 720*a*, 720*b*, 720*c* and 720*d*. In the event, the capturing devices 720*a*, 720*b*, 720*c* and 720*d* include UWB capabilities, then UWB D2D links can be used to identify the position of the capturing devices 720*a*, 720*b*, 720*c* and 720*d* relative to each other. In another embodiment, leveraging UWB or 5G tags placed in the event location to assist with the localization of the terminal devices. In yet other embodiments, the localization can come from other communication hubs like Wi-Fi Access Points, LTE eNodeB, 3G NodeB or 2G BTS.

In certain embodiments, the network may determine the location of one of the capturing devise based on the measurements made by the capturing device and the network and provide the location of the capturing device to the TOVI application 420*a*. The TOVI application 420*a* may use a centralized approach, edge computing approach, or a hybrid approach. In other embodiments, NR Positioning Protocol or LTE Positioning Protocol may be used to carry the location of the capturing device.

Figure 8A:
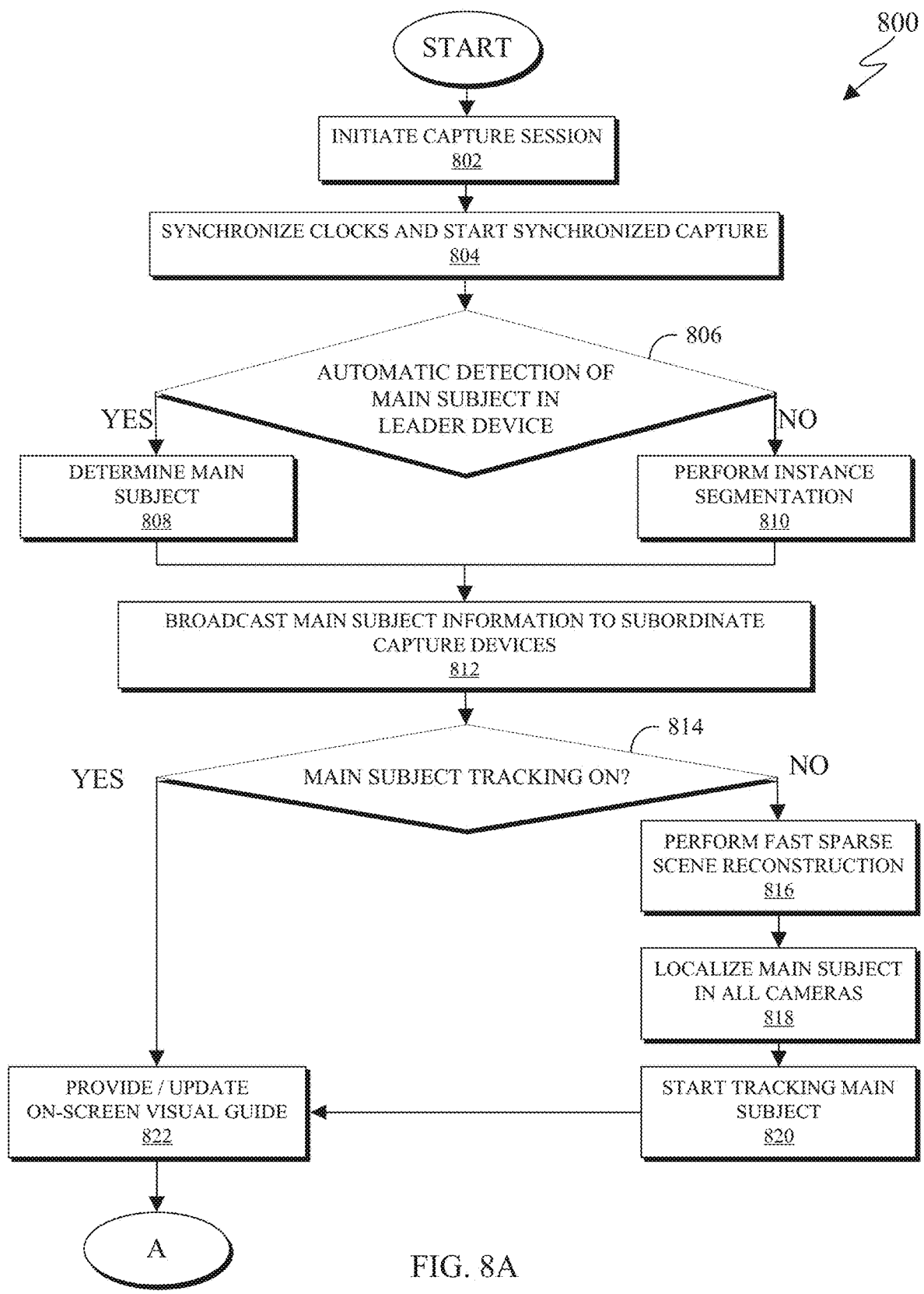
FIGS. 8A and 8B illustrate a method for reconstructing the immersive media in accordance with an embodiment of this disclosure.
Figure 8B:
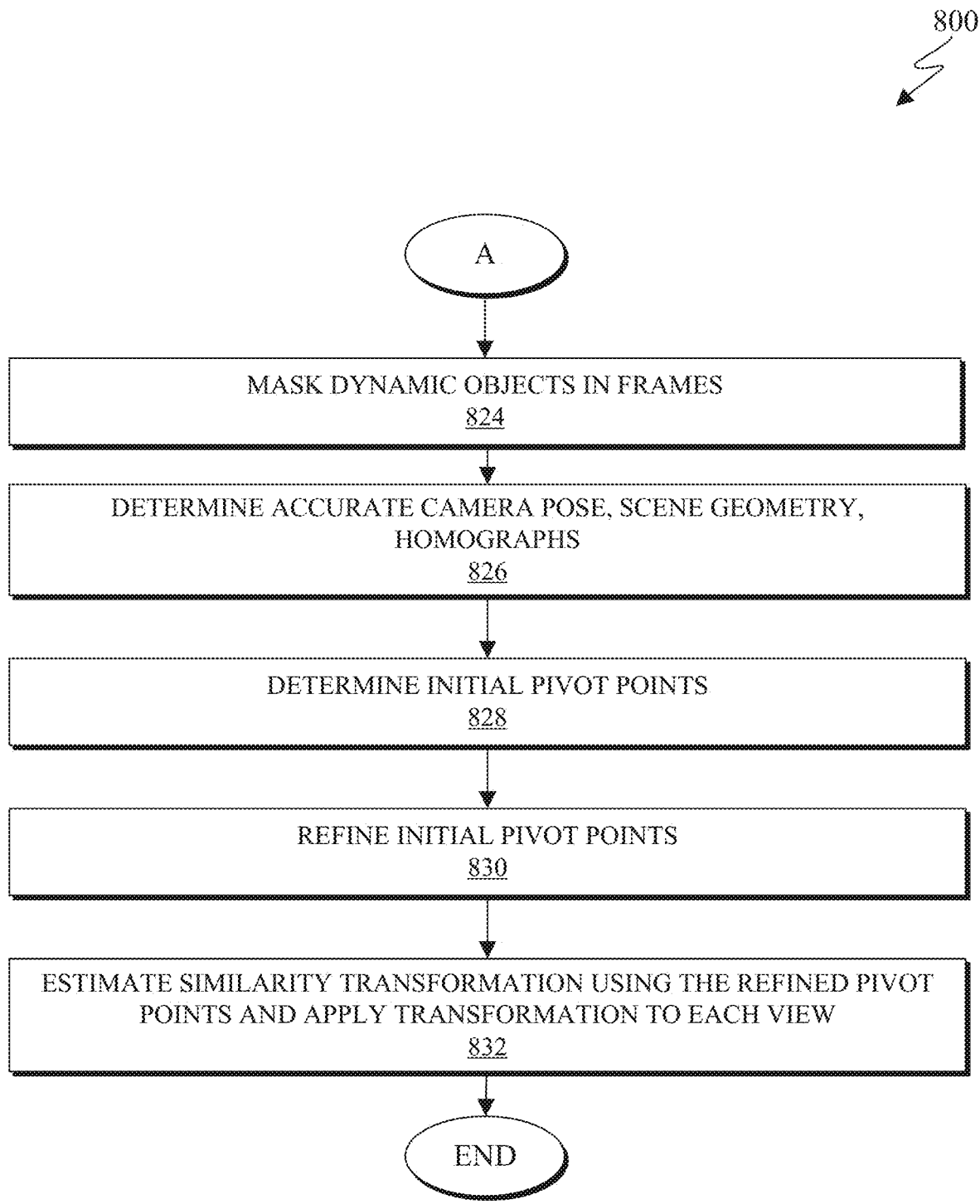

FIGS. 8A and 8B illustrates a method 800 for reconstructing the immersive media in accordance with an embodiment of this disclosure. The method 800 is described as implemented by any one of the client device 106-116 of FIG. 1 or the server 104 of FIG. 1 and can include internal components similar to that of server 200 of FIG. 2 and the electronic device 300 of FIG. 3. However, the method 800 as shown in FIGS. 8A and 8B could be used with any other suitable electronic device and in any suitable system.

As shown in method 800 of FIGS. 8A and 8B, at step 802, the TOVI generating device 415 (or the master device 415*a*) initiates a capture session via the TOVI application 420*a*. For example the TOVI application 420*a* sends a request to one or more of the capturing devices 440 to capture content of an event 430. In step 804, the TOVI application 420*a* performs a clock synchronization process After the clocks of the capturing devices 440 are synced, the capturing device 440 start synchronized capture of the event 430.

In step 806 the TOVI application 420*a* determines how to identify the main subject in the leading device (such as the master device 415*a*). If the determination is to use an automatic detection, then in step 808, the TOVI application 420*a* determines the main subject that is at least present in the master camera's FOV. For example an object detection algorithm identifies various objects that are present in the scene. Then, each detected object is assigned an aggregate score based on the class of object (for example a person is given a greater class-score, than a pet, which is given a greater class-score than a chair, and the like), object occupancy relative to the frame size (objects with greater occupancy is given more weight), and the location of the object in the FOV (objects towards the center are assigned greater score than objects towards the periphery of the FOV). Based on the score the main object is detected. For example, the object with the highest score is identified as the main object.

Alternatively, if the determination is to not use an automatic detection, then in step 808, the TOVI application 420*a* performs an instance segmentation of objects in the FOV. The segmentation process identifies (distinguishes) regions of the content for the user of the device to select one of the identified segments as the main object.

In step 812, the TOVI application 420*a* transmits the identified main object (from step 808 or step 810) to the capturing device 440. In step 812, the TOVI application 420*a* determines whether an object tracking operation, for tracking the indicated main object, is activated on the capturing devices. If the object operation, for tracking the indicated main object, is not activated, then in step 816, a sparse scene reconstruction is performed. The sparse reconstruction can be used to transform the coordinates and other such geometric information of the main subject in the frame of the master device 415*a* to the other devices' frame. In certain embodiments, the sparse scene reconstruction is not performed for every frame as time progresses even if the main subject moves and the camera orientations change to in response to the subject movement.

In step 818, the TOVI application 420*a* determines the location of the main subject in the other FOV of the other cameras of the capturing devices 440. For example, the capturing devices 440 perform a fast instance segmentation of the scene and selects the region (or instance) that overlaps with the main subjects' geometric location following the transformation of the main subject's location from the master camera's frame to the subordinate camera's frame. Thereafter, in step 820, the capturing devices start tracking the main object.

If the object operation, for tracking the indicated main object, is activated (as determined in step 814) or tracking the main object was initiated (in step 820), then in step 822, the TOVI application 420*a* (or the TOVI application 420*b* on the capturing dev ices) provides updates and on screen visual ques to guide the user to continue to capture the indicated main object.

In step 824, dynamic objects in the frames are masked. In certain embodiments, the TOVI application 420*a* performs instance segmentation (such as by using Mask R-CNN, and the like) to identify and localize the presence of objects in the scene that are typically dynamic such as people, animals, sports balls, sport bats, and the like Then, a union of identified regions corresponding to the dynamic objects is used to generate a mask. In certain embodiments, the TOVI application 420*a* may perform object detection to identify and localize the presence of dynamic objects in the scene. Then, a union of the bounding boxes corresponding to the dynamic objects is used to generate a mask.

In step 826, the TOVI application 420*a* determines accurate camera pose, scene geometry and homographies. In step 828, the TOVI application 420*a* determines the initial pivot points. In certain embodiments, the pivot points may be derived from the coordinates of the bounding box belonging to the main subject in each view (individual video). For example, the coordinates of the center points of the top and bottom sides of the main subject's bounding box may be designated as the initial pivot points. In certain embodiments, a line connecting the top and bottom center coordinates of the bounding box passes through the center of the main subject. In certain embodiments, a pose landmark estimation is performed to identify the initial pivot points.

In step 830, the initial pivot points are refined. For example, refining removes noise from the initial pivot points. to remove noise, a filtering is performed. In certain embodiments, filtering is first applied temporally to the initial pivot points independently for each view (video from each of the independent cameras).

In step 832, the TOVI application 420*a* estimates a similarity transformation using the pivot points and applying a transformation to each view. For example, the refined pivot points (of step 830) are used to estimate the similarity transformations (accounts for scaling, rotation, and spatial alignment) that are used to align the views and create a free viewpoint video without any calibration.

Although FIGS. 8A and 8B illustrate one example of a method 800 for reconstructing the immersive media content, various changes may be made to FIGS. 8A and 8B. For example, while shown as a series of steps, various steps in FIG. 8 could overlap, occur in parallel, or occur any number of times.

FIG. 9 illustrates a UI 900 of an electronic device while capturing media in accordance with an embodiment of this disclosure. The electronic device of FIG. 9 could be similar to any of the client devices 106-116 of FIG. 1, any of the capturing devices 440a-440n of FIGS. 4A, 4B, 4C, and 4D, and can include internal components similar to that of the electronic device 300 of FIG. 3. The example UI 900 as shown in FIG. 8 illustrates one specific example of an of a recommendation to move the camera while capturing medial content.

As shown in FIG. 9, the UI 900 is a view from a display of one of the capturing devices 440. The UI 900 includes a FOV 910. The FOV 910 includes a guide box 920 surrounding a main object 915. The UI 900 also includes indicator 930. The indicator 930 is similar to the on screen visual guides of step 822 of FIG. 8A. The indicator 930 appears to the right of the main object 915, indicating to the user of the capturing device to shift the FOV to the right. It is understood that the indicator 930 can appear in different locations on the FOV 910 for indicating to the user of the capturing device to move the FOV in different directions. For example, the indicator 930 can be positioned above the main object 915 (indicating that the user is to adjust the camera higher), below the main object 915 (indicating that the user is to adjust the camera lower), to the left of the main object (indicating that the user is to adjust the camera to the left), and the like.

FIG. 10A illustrates a diagram 1000a of initial pivot points of an object in accordance with an embodiment of this disclosure. FIG. 10B illustrates a diagram 1000b of pose landmarks and antipodal points in accordance with an embodiment of this disclosure. The example diagrams 1000a and 1000b as shown in FIGS. 10A and 10B illustrate one specific example of identifying pivot points.

FIG. 10A, illustrates identifying the initial pivot points of a main object 1010 is captured by one of the capturing devices 440. The initial pivot points of the main object 1010 are obtained using two bounding boxes, that of a full body bounding box 1006 and a face bounding box 1004. A first pivot point 1002 is identified at the top of the full body bounding box 1006 and a face bounding box 1004, while a second pivot point 1008.

As shown in FIG. 10B, the pose landmarks are identified on the main object 1010. The antipodal points from the line joining the center of the shoulder joints 1020 and the center of the hip joints 1030 of the main object 1010 are projected to the vertical axis and selected as the initial pivot points (before refinement). For example the center of the shoulder joints 1020 is projected and becomes the top pivot point 1022. Similarly, the center of the hip joints 1030 is projected and becomes the bottom pivot point 1032.

FIGS. 11A and 11B illustrates example field of view overlaps in various arrangements in accordance with an embodiment of this disclosure. FIG. 11A illustrates a linear camera arrangement 1100a, since the FOV of the cameras 1102 and camera 1104 are positioned along a linear line. The FOV of the cameras 1102 and camera 1104 have an FOV overlap 1110. When the TOVI application 420a determines that the capturing devices 440 are arranged in a linear arrangement 1100a (based on a comparison of the FOV overlap 1110 to a threshold), the TOVI application 420a performs view synthesis between the views of the camera 1102 and the camera 1104.

FIG. 11B illustrates a circular camera arrangement 1100b, since the FOV of the cameras 1106 and camera 1108 are positioned along a curve. An interview angle 1114 and a pivot angle 1112 are based on the FOV of the cameras 1106 and camera 1108. When the TOVI application 420a determines that the capturing devices 440 are arranged in a circular arrangement 1100b, then the TOVI application compares the inter-view angle 1114 to a threshold. Based on the determination, (such as when the inter-view angle 1114 is greater than 30 degrees) the TOVI application 420a performs view synthesis between the views of the camera 1106 and the camera 1108.

FIG. 12 illustrates an example of an electronic device 1200 recommending a change in orientation of an electronic device while capturing media in accordance with an embodiment of this disclosure. The electronic device of FIG. 12 could be similar to any of the client devices 106-116 of FIG. 1, any of the capturing devices 440a-440n of FIGS. 4A, 4B, 4C, and 4D, and can include internal components similar to that of the electronic device 300 of FIG. 3. The electronic device 1200 as shown in FIG. 12 illustrates one specific example of an of a recommendation to change the orientation of the electronic device while capturing medial content.

Figure 13:
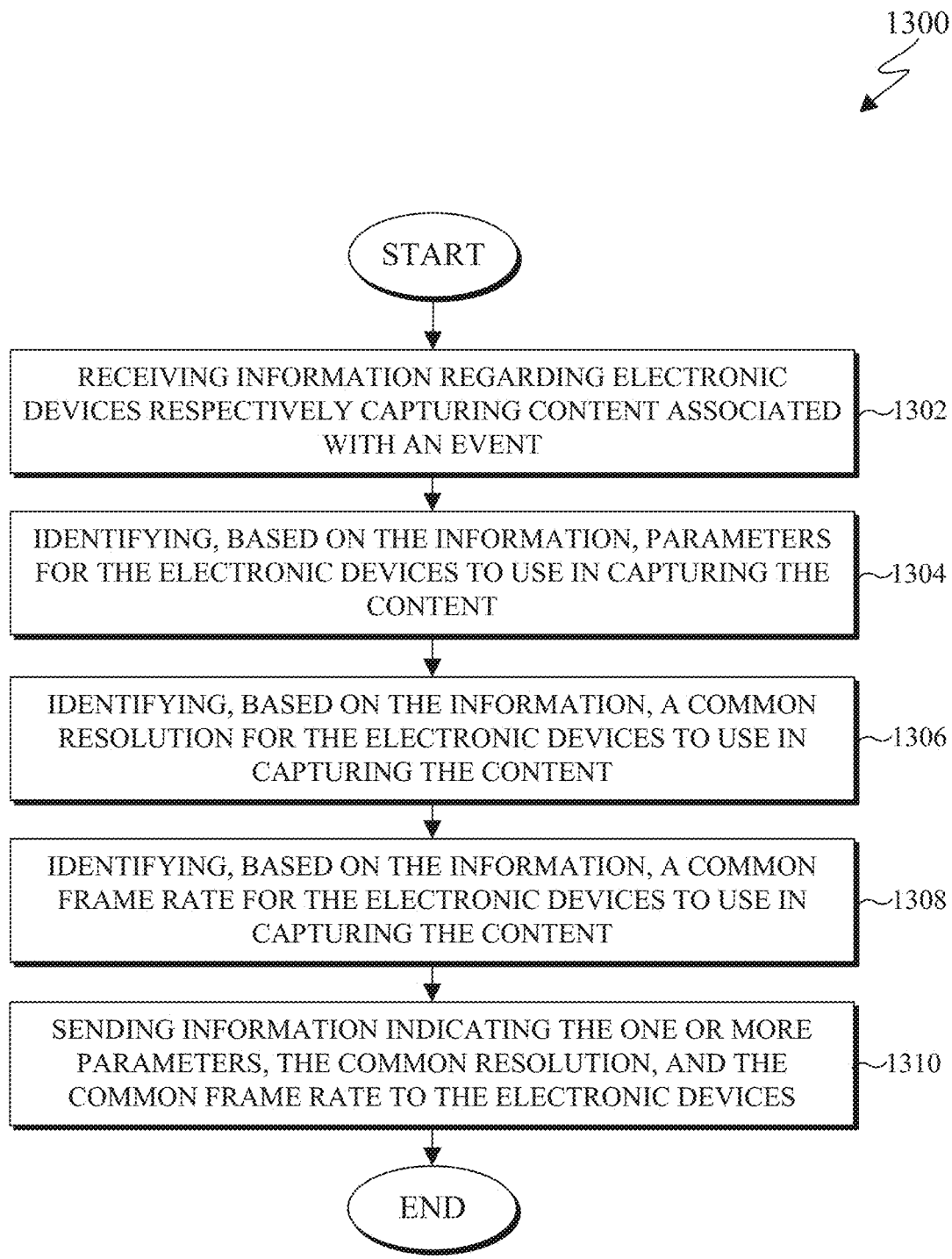
FIG. 13 illustrates an example method for generating content in accordance with an embodiment of this disclosure.

As discussed above, the TOVI application 420a can provide an indication to one or more of the capturing devices 440 to adjust the orientation of the video capture. For example, as shown in FIG. 12, the electronic device 1200 is similar to any of the capturing devices 440. The electronic device 1200 is capturing content of a main object 1202. The main object 1202 is identifiable based on the visual queue 1204. When the TOVI application 420a determines that most of the capturing devices are using an orientation that is different than the electronic device 1200, the TOVI application 420a, sends one or more indicators to the electronic device 1200. For example, the TOVI application 420a presents a written indicator 1206 describing that the orientation should be changed to portrait mode rather than the current landscape mode. For another example, the TOVI application 420a presents a visual indicator 1208. The visual indicator 1208 is depicted as an arrow to indicate the particular direction to change the orientation of the electronic device 1200. It is noted that over written indicator 1206 and visual indicator 1208 can be used to notify the user of the electronic device 1200 to change the orientation of the electronic device FIG. 13 illustrates an example method 1300 for generating content in accordance with an embodiment of this disclosure. The method 1300 is described as implemented by any one of the client device 106-116 of FIG. 1, the server 104 of FIG. 1, the TOVI generating device 415, or the master device 415a, and can include internal components similar to that of server 200 of FIG. 2 and the electronic device 300 of FIG. 3. However, the method 1300 as shown in FIG. 13 could be used with any other suitable electronic device and in any suitable system.

In step 1302, the electronic device receives information regarding electronic devices respectively capturing content associated with an event. The information can include media content as well as metadata.

In step 1304, the electronic device identifies, based on the received information, one or more parameters for the electronic devices to use in capturing the content. The one or more parameters are identified to assist in generating multi-view content for the event from the content that is captured by the capturing devices.

In certain embodiments, the electronic device identifies an orientation of the capturing, an exposure value, a target ISO sensitivity, and an exposure time, a target color temperature value for the electronic devices to use in capturing the content. For example, based on the orientations, the electronic device determines a common orientation. The common orientation can be an orientation used by majority of the electronic devices.

In step 1306, the electronic device identifies, based on the received information, a common resolution for the electronic devices to use in capturing the content. For example, to identify the common resolution, the electronic device can determine whether the content is for streaming. When the content is for streamlining the common resolution is based on network capabilities. Alternatively, when the content is not for streamlining the common resolution is highest resolution supported by all the electronic devices.

In step 1308, the electronic device identifies, based on the received information, a common frame rate for the electronic devices to use in capturing the content. For example, the frame rate can be the highest frame rate supported by all of the capturing devices.

In step 1310, the electronic device sends information indicating the one or more parameters, the common resolution, and the common frame rate to the electronic devices. Thereafter the electronic devices uses the sent information to specify how to capture the content of the live event. The electronic device then receives content of the event that is captured according to the sent information. For example, after the information is sent to the electronic devices, receive captured content associated with the event from the electronic devices. The electronic device aligns pivot points of the captured content and then generates multi-view content based on the aligned pivot points.

Although FIG. 13 illustrates one example of a method 1300 for generating content, various changes may be made to FIG. 13. For example, while shown as a series of steps, various steps in FIG. 13 could overlap, occur in parallel, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined by the claims.

What is claimed is:

1. An electronic device for generating content, the electronic device comprising:
a communication interface configured to receive information regarding electronic devices respectively capturing content associated with an event; and
a processor operably coupled to the communication interface, the processor configured to:
identify, based on the received information, one or more parameters for the electronic devices to use in capturing the content, the one or more parameters identified to assist in generating multi-view content for the event from the content that is captured by the electronic devices,
when the content is for streaming to multiple viewing devices, identify, based on the received information, a network congestion level and a common resolution for the electronic devices to use in capturing the content based on the network congestion level, the common resolution based in part on a determination of whether the content is for streaming to the multiple viewing devices,
when the content is not streamed, identify the common resolution as a highest resolution supported by all of the electronic devices,
identify, based on the received information, a common frame rate for the electronic devices to use in capturing the content,
determine a distance between the electronic devices, and
determine a communication protocol to send information indicating the one or more parameters, the common resolution, and the common frame rate to the electronic devices based on the determined distance between the electronic devices,
wherein the communication interface is further configured to send the information indicating the one or more parameters, the common resolution, and the common frame rate to the electronic devices.

2. The electronic device of claim 1, wherein the processor is further configured to:
identify, based on metadata, landscape and portrait orientations of the electronic devices when capturing the content;
determine, based on the landscape and portrait orientations of the electronic devices, a common orientation, wherein the common orientation is an orientation used by a majority of the electronic devices; and
broadcast the common orientation to the electronic devices.

3. The electronic device of claim 1, wherein the processor is further configured to:
identify a scene dynamics value based analyzing average magnitudes of motion vectors relative to a video frame width or height for consecutive video frames;
compare the scene dynamics value to a threshold;
based on the scene dynamics value being less than the threshold, send, to the electronic devices, information frame drops for frame synchronization; and
based on the scene dynamics value being greater than the threshold, send, to the electronic devices, information indicating synthesizing frames based on video frame interpolation for frame synchronization.

4. The electronic device of claim 1, wherein the processor is further configured to:
receive at least a portion of captured content from the electronic devices;
identify, based on analyzing the captured content, at least two objects from the captured content from a first electronic device of the electronic devices;
determine a score for each of the at least two objects from the captured content of the first electronic device; and
send, to others of the electronic devices, information indicating a main object based on the score for the main object being a highest score and indicators to guide capture of the main object by the others of the electronic devices.

5. The electronic device of claim 1, wherein the processor is further configured to:
receive at least a portion of captured content from the electronic devices;
identify, based on analyzing the captured content, a field of view (FOV) overlap between neighboring views;
determine whether to synthesize a view between the neighboring views based on whether the FOV overlap between the neighboring views is below a threshold; and
in response to determining to synthesize the view, perform view synthesis between the neighboring views.

6. The electronic device of claim 1, wherein:
to identify the one or more parameters, the processor is configured to determine, based on the received information regarding the electronic devices, an exposure value, a target ISO sensitivity, and an exposure time for the electronic devices to use in capturing the content;
to identify the one or more parameters, the processor is configured to determine, based on analyzing one or more images of captured content that is received from one or more of the electronic devices, a target color temperature value for the electronic devices to use in capturing the content; and
the processor is further configured to generate an incentive based on at least one of a duration of the captured content, a type of the event, or quality of the captured content.

7. The electronic device of claim 1, wherein when the content is not streamed, the common resolution is a highest resolution supported by a lower resolution device among all of the electronic device, wherein the lower resolution device has a lower maximum resolution that at least one other of the electronic devices.

8. The electronic device of claim 1, wherein the processor is further configured to:
identify the common frame rate as highest frame rate supported by all of the electronic devices, wherein, when the content is not streamed, the common resolution identified as the highest resolution is supported by all of the electronic devices that capture above a predefined resolution threshold.

9. The electronic device of claim 1, wherein the processor is further configured to:
after the information is sent to the electronic devices, receive captured content associated with the event from the electronic devices;
identify two pivot points associated with a main object from the captured content of a first electronic device and second electronic device;
align the pivot points of the captured content from the second electronic device with the pivot points of the captured content from the first electronic device; and
generate the multi-view content based on the aligned pivot points.

10. A method for generating content, the method comprising:
receiving information regarding electronic devices respectively capturing content associated with an event;
identifying, based on the received information, one or more parameters for the electronic devices to use in capturing the content, the one or more parameters identified to assist in generating multi-view content for the event from the content that is captured by the electronic devices;
when the content is based on the received information, a network congestion level and a common resolution for the electronic devices to use in capturing the content based on the network congestion level, the common resolution based in part on a determination of whether the content is for streaming to the multiple viewing devices;
when the content is not streamed, identifying the common resolution as a highest resolution supported by all of the electronic devices;
identifying, based on the received information, a common frame rate for the electronic devices to use in capturing the content;
determining a distance between the electronic devices; and
determining a communication protocol to send information indicating the one or more parameters, the common resolution, and the common frame rate to the electronic devices based on the determined distance between the electronic devices; and
sending the information indicating the one or more parameters, the common resolution, and the common frame rate to the electronic devices.

11. The method of claim 10, further comprising:
identifying, based on metadata, landscape and portrait orientations of the electronic devices when capturing the content;
determining, based on the landscape and portrait orientations of the electronic devices, a common orientation, wherein the common orientation is an orientation used by a majority of the electronic devices; and
broadcasting the common orientation to the electronic devices.

12. The method of claim 10, further comprising:
identifying a scene dynamics value based analyzing average magnitudes of motion vectors relative to a video frame width or height for consecutive video frames;
comparing the scene dynamics value to a threshold;
based on the scene dynamics value being less than the threshold, sending, to the electronic devices, information frame drops for frame synchronization; and
based on the scene dynamics value being greater than the threshold, sending, to the electronic devices, information indicating synthesizing frames based on video frame interpolation for frame synchronization.

13. The method of claim 10, further comprising:
receiving at least a portion of captured content from the electronic devices;
identifying, based on analyzing the captured content, at least two objects from the captured content from a first electronic device of the electronic devices;

determining a score for each of the at least two objects from the captured content of the first electronic device; and sending, to others of the electronic devices, information indicating a main object based on the score for the main object being a highest score and indicators to guide capture of the main object by the others of the electronic devices.

14. The method of claim 10, further comprising:

receiving at least a portion of captured content from the electronic devices;

identifying, based on analyzing the captured content, a field of view (FOV) overlap between neighboring views;

determining whether to synthesize a view between the neighboring views based on whether the FOV overlap between the neighboring views is below a threshold; and in response to determining to synthesize the view, performing view synthesis between the neighboring views.

15. The method of claim 10, wherein:

identifying the one or more parameters comprises determining, based on the received information regarding the electronic devices, an exposure value, a target ISO sensitivity, and an exposure time for the electronic devices to use in capturing the content;

identifying the one or more parameters comprises determining, based on analyzing one or more images of captured content that is received from one or more of the electronic devices, a target color temperature value for the electronic devices to use in capturing the content; and the method further comprises generating an incentive based on at least one of a duration of the captured content, a type of the event, or quality of the captured content.

16. The method of claim 10, wherein:

a remote electronic device, that is located remotely from the event, identifies the common resolution and the common frame rate for the electronic devices and sends the information indicating the one or more parameters, the common resolution, and the common frame rate to the electronic devices; or one of the electronic devices capturing the content at the event is identified as a master device, and the master device receives the information regarding other ones of the electronic devices, identifies the common resolution and the common frame rate for the electronic devices, and sends the information indicating the one or more parameters, the common resolution, and the common frame rate to the other electronic devices.

17. The method of claim 10, further comprising:

identifying the common frame rate as highest frame rate supported by all of the electronic devices, wherein, when the content is not streamed, the common resolution identified as the highest resolution is supported by all of the electronic devices that capture above a predefined resolution threshold.

18. The method of claim 10, further comprising:

after the information is sent to the electronic devices, receiving captured content associated with the event from the electronic devices;

identifying two pivot points associated with a main object from the captured content of a first electronic device and second electronic device;

aligning the pivot points of the captured content from the second electronic device with the pivot points of the captured content from the first electronic device; and generating the multi-view content based on the aligned pivot points.

19. The electronic device of claim 8, wherein the processor is further configured to:

up-sample frames captured from electronic devices that do not capture above the predefined resolution threshold.

20. The method of claim 17, further comprising:

up-sampling frames captured from electronic devices that do not capture above the predefined resolution threshold.

* * * * *